United States Patent [19]

Chee

[11] Patent Number: 4,854,525

[45] Date of Patent: Aug. 8, 1989

[54] ENGINE MOUNTING ASSEMBLY

[75] Inventor: Wan T. Chee, Bellevue, Wash.

[73] Assignee: The Boeing Company, Seattle, Wash.

[21] Appl. No.: 52,761

[22] Filed: May 19, 1987

[51] Int. Cl.$^4$ .............................................. B64D 27/12
[52] U.S. Cl. .................................... 244/54; 248/554; 60/39.31
[58] Field of Search ............................. 244/53 R, 54; 248/554–557; 60/39, 31

[56] References Cited

U.S. PATENT DOCUMENTS

| | | |
|---|---|---|
| 2,718,756 | 9/1955 | McDowall . |
| 2,738,647 | 3/1956 | Hill . |
| 3,222,017 | 12/1965 | Bobo . |
| 3,448,945 | 8/1966 | Ascani, Jr. . |
| 3,750,983 | 8/1973 | Morris . |
| 3,848,832 | 11/1974 | Stanley et al. . |
| 3,907,220 | 9/1975 | Amelio . |
| 4,013,246 | 3/1977 | Nightingale ............................ 244/54 |
| 4,044,973 | 8/1977 | Moorehead . |
| 4,055,041 | 10/1977 | Adamson et al. . |
| 4,318,516 | 3/1982 | Cole . |
| 4,361,296 | 11/1982 | Hall et al. . |
| 4,437,627 | 3/1984 | Moorehead ............................ 244/54 |
| 4,458,863 | 7/1984 | Smith . |
| 4,474,346 | 10/1984 | Murphy et al. . |
| 4,555,078 | 11/1985 | Grognard . |
| 4,560,122 | 12/1985 | Parkinson et al. ...................... 244/54 |
| 4,603,821 | 8/1986 | White ..................................... 244/54 |
| 4,634,081 | 1/1987 | Chee ..................................... 244/54 |

FOREIGN PATENT DOCUMENTS 823562 1/1938 France .................................. 244/54

Primary Examiner—Galen Barefoot
Attorney, Agent, or Firm—Hughes & Multer

[57] ABSTRACT

An engine mounting system where an aft body mounted counter-rotation prop fan engine is mounted to aircraft structure. The engine is connected through a longitudinally extending beam to a mounting strut structure comprising a fore spar, a mid spar and a rear spar. Vertical loads and lateral loads are transmitted from the engine to the beam at forward and rear locations, and these vertical and lateral loads are in turn transmitted to the spars at forward and rear locations. The torque loads from the engine are transmitted at a selected location into the beam, and then transmitted through the beam to the spar or spars at a selected location or locations. The beam can initially be mounted to either the engine or to the spars of the aircraft.

78 Claims, 17 Drawing Sheets

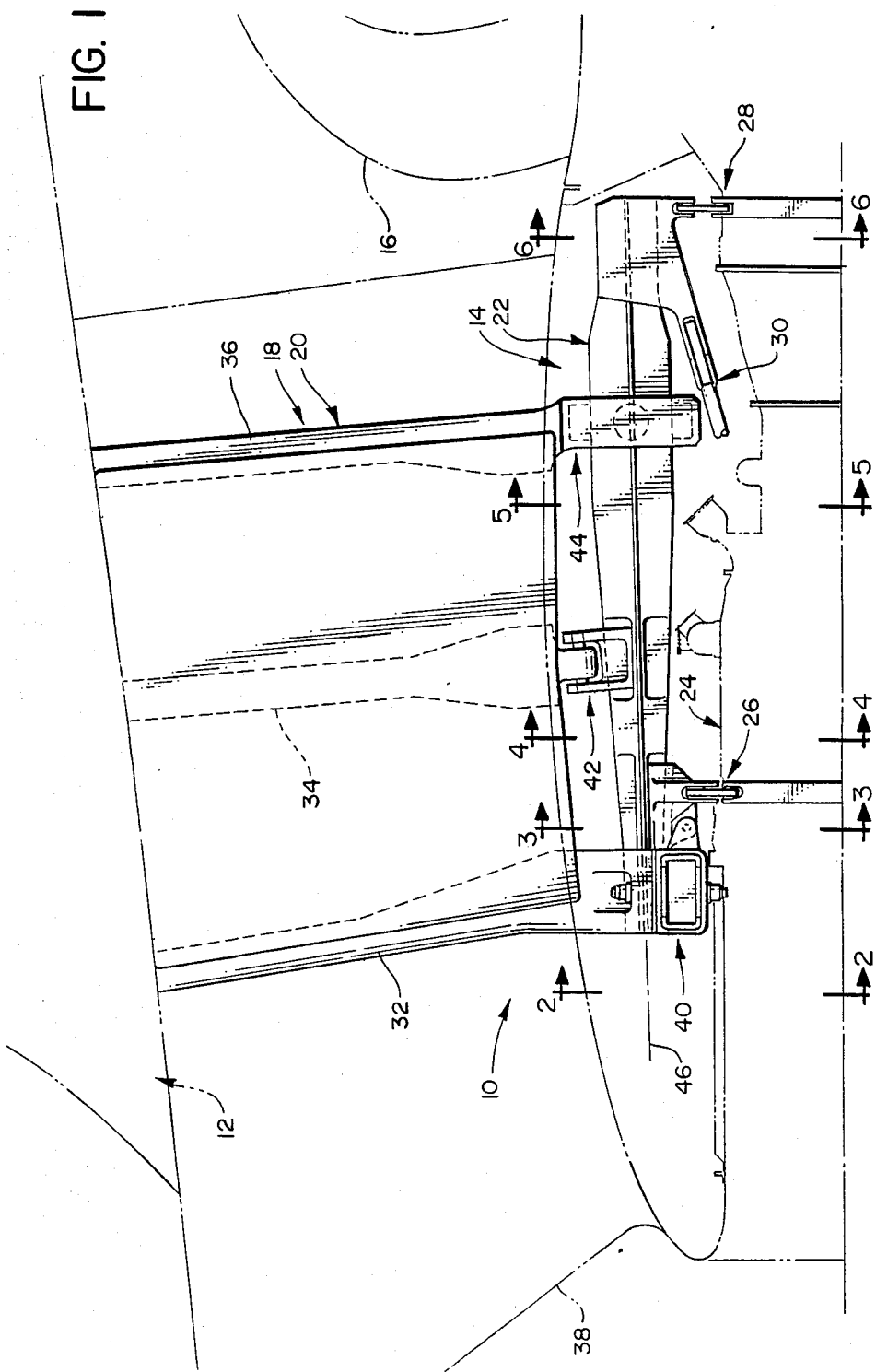

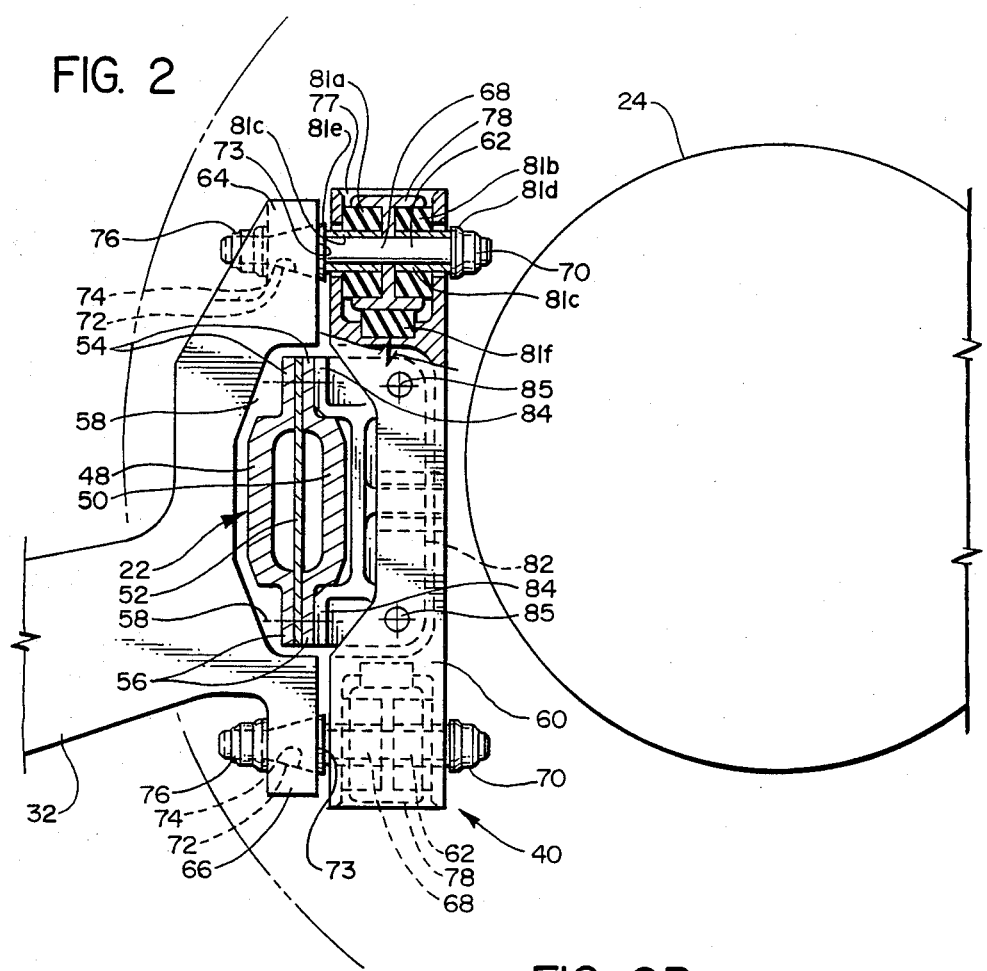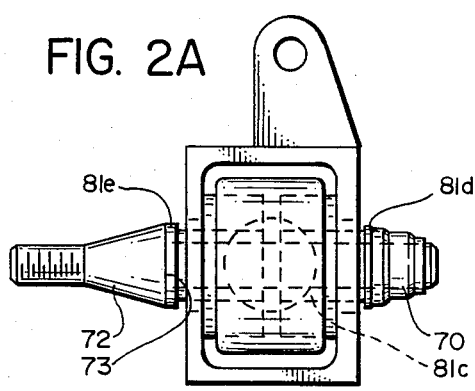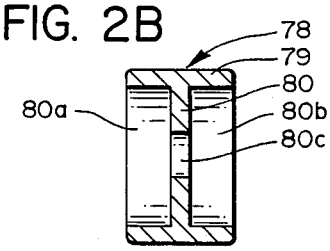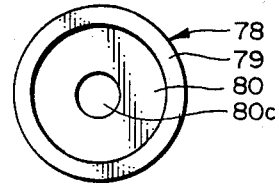

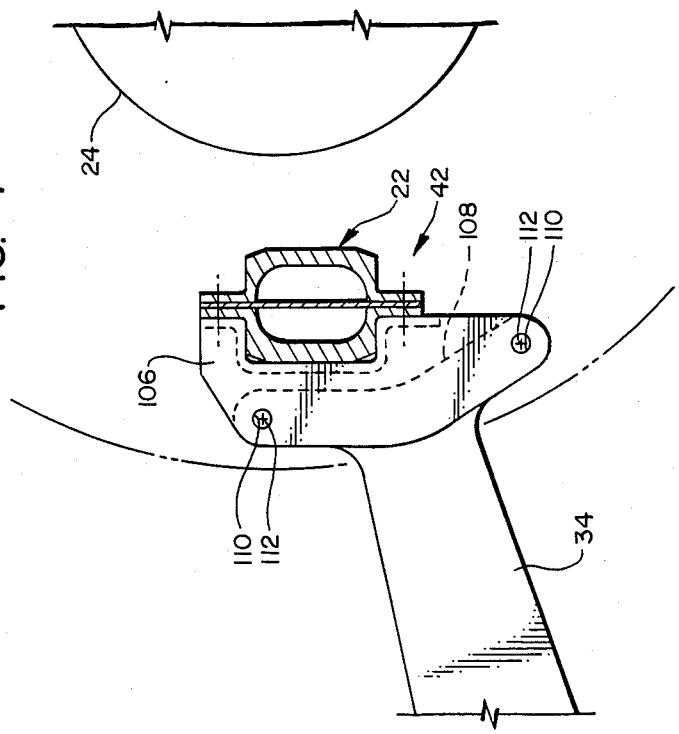
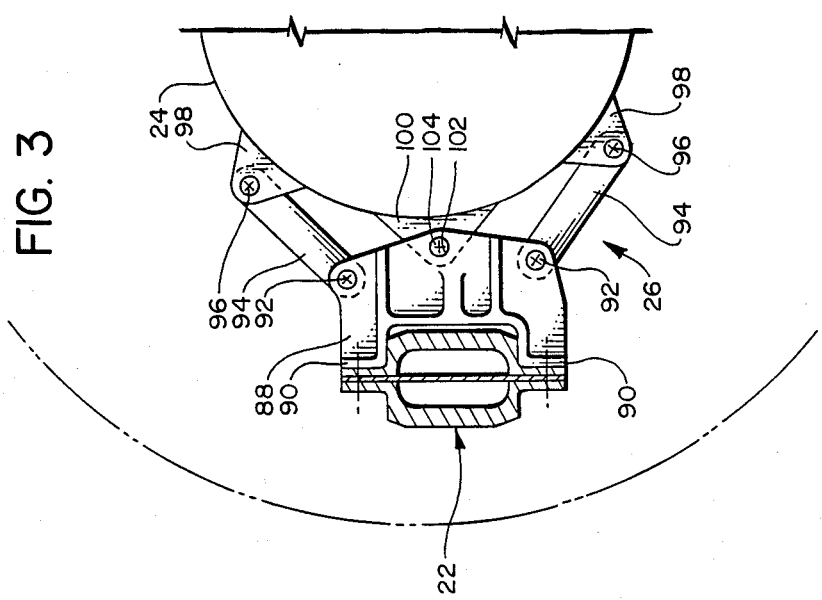

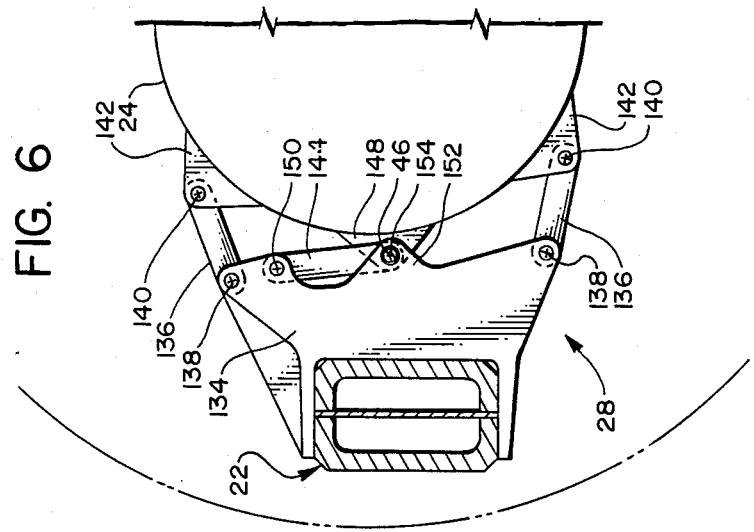
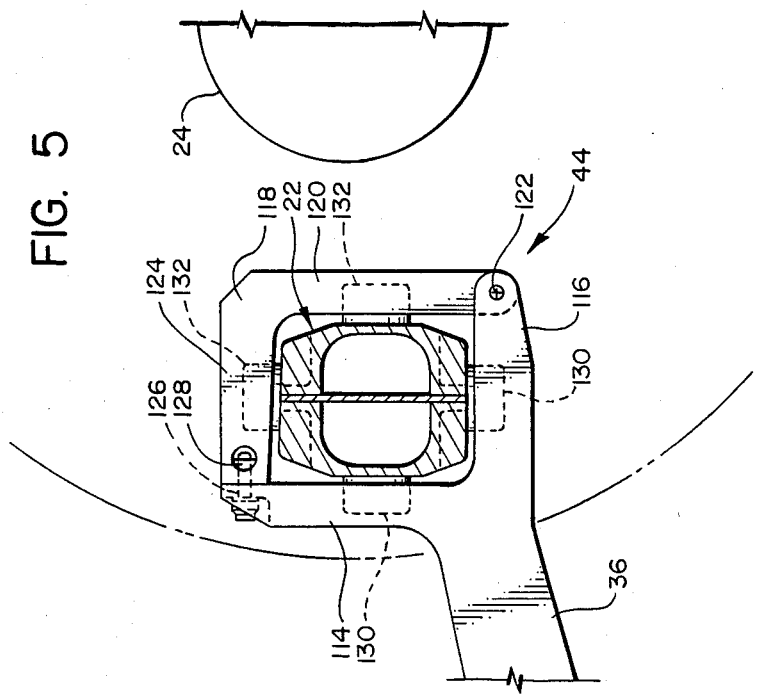

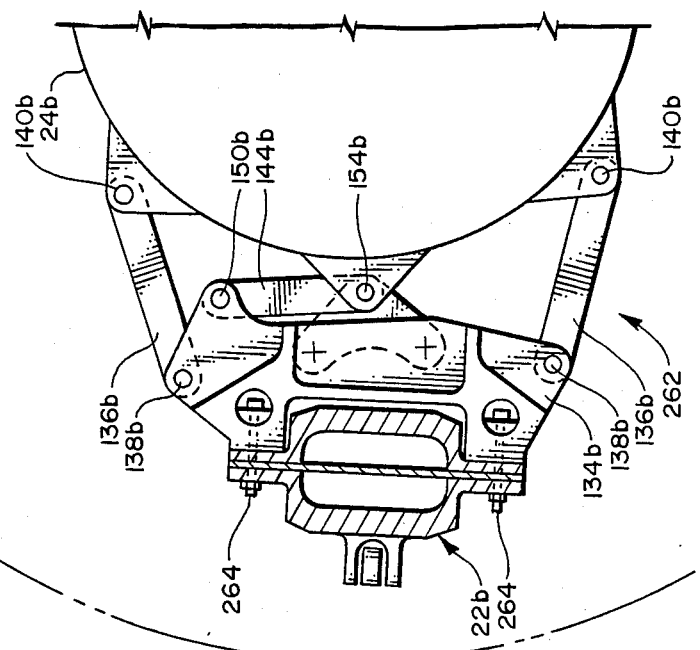
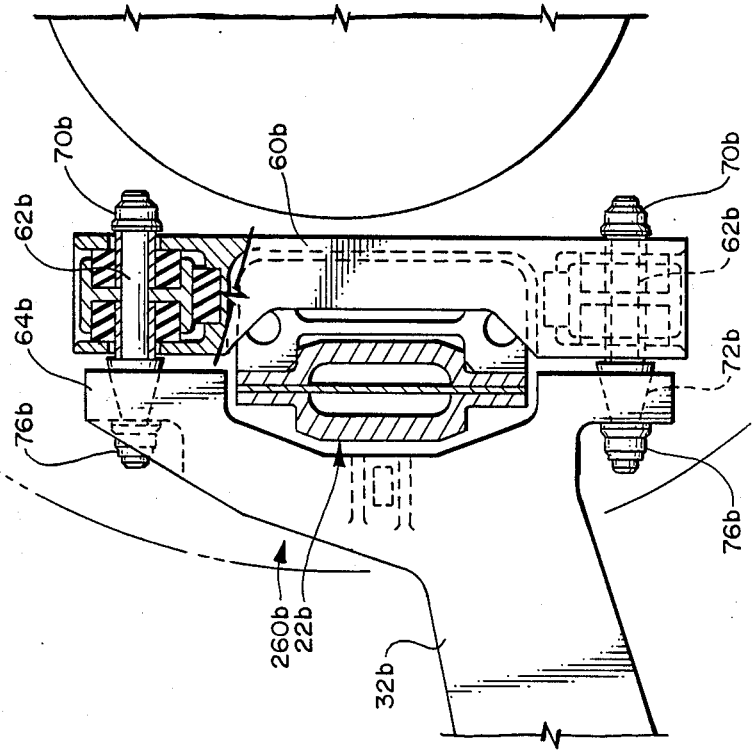

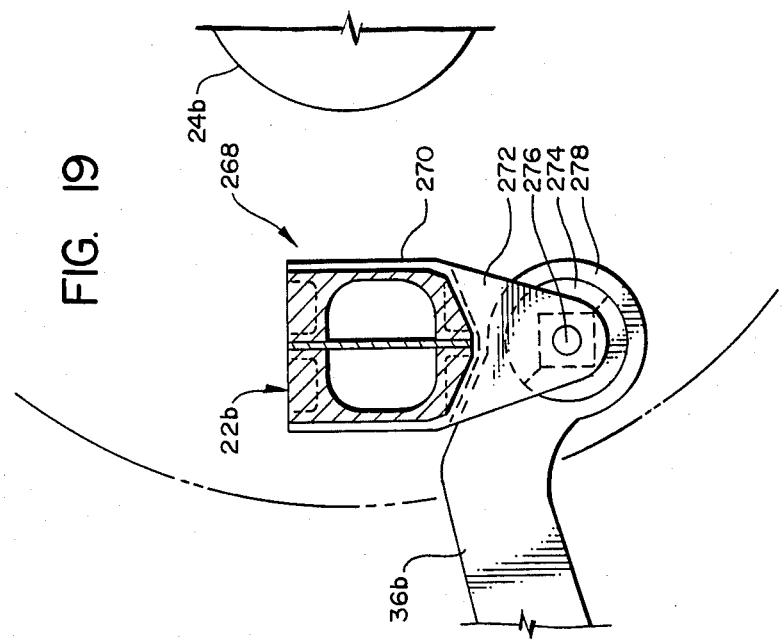
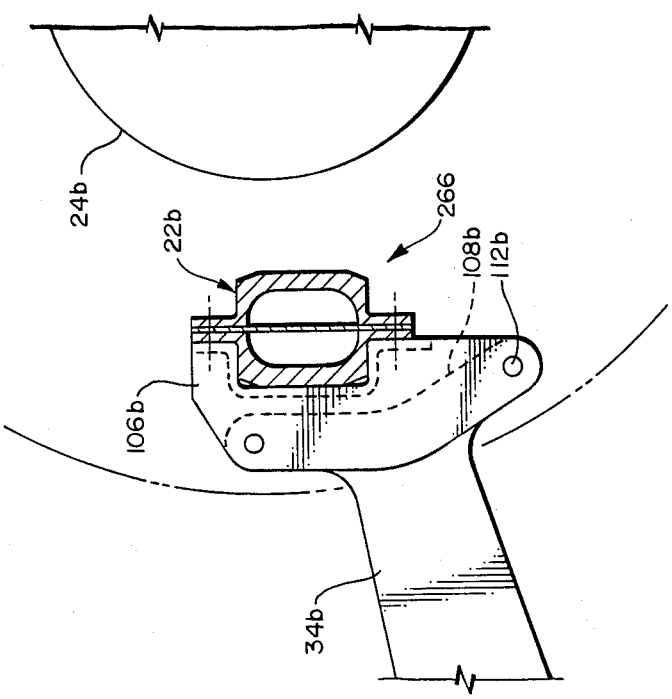

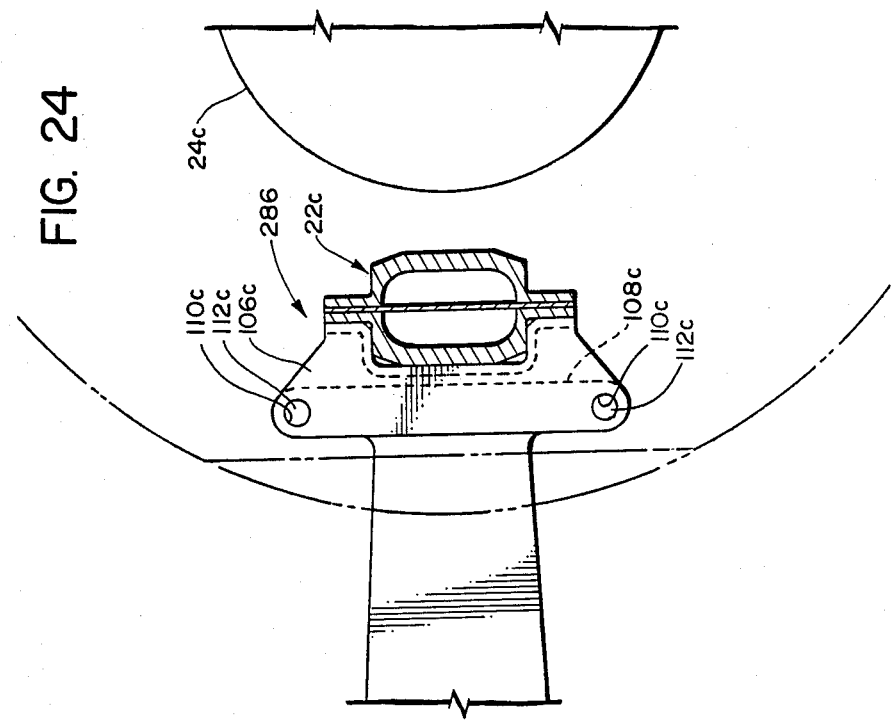
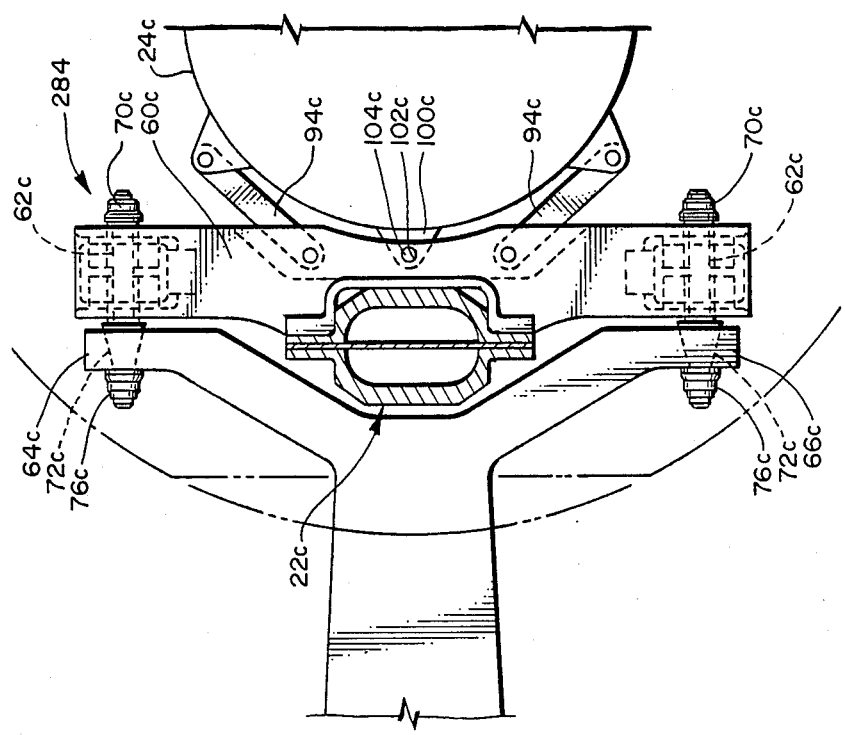

ENGINE MOUNTING ASSEMBLY

BACKGROUND ART (a) Field of the Invention

The present invention relates to an apparatus and method for mounting an aircraft engine to an aircraft, and more particularly to such an apparatus and method particularly adapted to meet engine mounting requirements such as those encountered in mounting an aft body mounted counter-rotation propfan engine.

(b) Background Art

The mounting structure of an aircraft engine must be able to withstand transverse loads (i.e. vertical and lateral loads resulting from gravitational forces and also "G" forces), thrust loads (exerted in a forward direction during flight and in an opposite direction during thrust reversal), gyroscopic loads (pitch and yaw) and also engine generated torque loads. These torque loads can result from the rotating components of the engine acting on the air mass, with the resistance of the air mass in turn being reacted into the engine and through the engine housing to the engine support structure, and more severe torque loads can result from vertical loads, engine seizure, or catastrophic failure of engine rotor due to fan blade-out.

One of the problems in designing a modern day aircraft is the matching of the engine to the rest of the airplane. In modern day aircraft, the overall structure of the aircraft is commonly designed by an airplane manufacturing company, and this is generally a blend of aerodynamic considerations, structural considerations, as well as many other considerations. On the other hand, the engines are commonly designed by an engine manufacturer, and while the engine manufacturer designs the engine to meet the major design requirements of the airplane manufacturer, the designer of the engine in turn imposes certain requirements upon the airplane manufacturer, such as structural requirements. More specifically, the engine designer is faced with the problems of how to react the rather substantial loads generated by the engine into the engine structure and in turn transmit these loads from the engine structure into the main structure of the aircraft. Thus, it sometimes happens that the structural pattern envisioned by the aircraft designer relative to the engine mounting would not correspond to the pattern desired by the engine manufacturer. Further, it is not always practical for the engine designer to keep modifying the engine design to fit the exact requirements of various aircraft manufacturers, since the same basic engine design might be used for a variety of designs of different airplane manufacturers. Another quite serious problem is that the engine should be mounted and arranged so as to minimize any adverse effect of unwanted transmission of noise and vibrations into the passenger area.

The problem areas outlined above become more serious with turboprop or turbofan engines. While turboprop engines offer substantial advantages in fuel savings over the turbofan engine, cabin noise propagated by the counter rotating propellers of the turboprop engine are of serious concern. Another problem is that there can be substantial energy release in case of propeller blade failure, and the shock caused by this sudden release in energy must be dampened, not only to provide passenger comfort, but also to protect the airframe structure. Further, there is the problem of generating substantial torque loads in the engine, particularly in a situation where one of the counter rotating propeller blades is not operational.

Thus, there exists a need to provide an engine mounting system which meets the following design criteria:

(a) The engine mount system must have the capability of reacting vertical, side, thrust and torque loads as well as pitch and yaw moments. Further, this must be done in a manner so that the locations at which these loads are imparted into the aircraft structure are optimized.

(b) The engine mount system must be designed to have dual load paths to meet failsafe requirements;

(c) The engine mount system must be designed with fuse pins to meet nacelle separation requirements;

(d) It must be designed to have vibration isolators for interior cabin noise and shock damping in case of engine unbalance due to propeller blade failure;

(e) It must be designed to carry an unbalanced load (i.e. currently designed for one complete blade out on each rotor or two on either rotor); and (f) The engine mount system must have the capability of allowing for radial and longitudinal thermal growth of the engine.

Further, the mount system should meet the requirements of ease of manufacture, installation, removal and maintenance.

The design of the present invention was made to satisfy these design criteria.

A search of the patent literature has disclosed a number of patents, and these are discussed below.

U.S. Pat. No. 4,318,516—Cole relates to a mounting system for an aircraft engine. This is a wing mounted engine where there is a mounting strut which extends downwardly and laterally outwardly from the wing. Thus, the weight of the engine tends to apply to the spars of the wing a moment which is opposite to the moment that is applied by the normal lift forces exerted on the wing. The purpose of this design is to relieve to some extent the total bending moment on the spars. FIG. 3 shows a first embodiment, where there is a tube 9 which is mounted to the front and rear wing spars 7 and 8 by means of two mounts 11 and 12. The forward mount 11 permits forward to rear slide motion of the mounting tube 9, while the rear tube 12 apparently has a fixed connection to the tube 9. Specifically, there is an arm 13 connected to the tube 9 and also to a pin 14 and the spar 8, and this resists rotation of the tube 9 about its lengthwise axis. The tube 9 is in turn connected to the nacelle, but the details of this connection are not shown. A second embodiment is shown in FIG. 4, and there are three wing spars 20, 21 and 22. There is a rear mounting tube 25 connected to the middle and rear spar 21 and 22. This tube 25 is connected to a flanged member 26 to resist torsional loads. The forward bearing 24 permits a certain amount of axial movement between the tube 23 and the mount 24. The overall purpose of the device shown in this patent is to place the mass of the engine at a location so that the weight of the engine will provide desirable bending moments in the wing structure. However, this patent does not contain any significant teaching of how to match the structural load transmitting characteristics of the engine to those of the aircraft structure.

U.S. Pat. No. 2,718,756—McDowall shows a mounting and support structure for an aircraft gas turbine power plant having reduction gearing. There are two rear motors B having output shafts extending forwardly therefrom and mounted in struts 26. The struts 26 are mounted to a housing of a gear reduction drive A. There are upper struts 37 positioned above the struts 26, and these extend from the upper part of the forward engine compressors 12 to an upper location of the gear reduction housing.

U.S. Pat. No. 2,738,647—Hill shows a gas turbine frame structure, where the power output and gas producing sections of the engine are interconnected by a frame structure comprising three triangularly arranged longitudinal frame members 76 disposed symmetrically about the longitudinal axis of the engine.

U.S. Pat. No. 3,222,017—Bobo shows a mounting for a jet engine having a rearwardly positioned fan casing. The thrust mounting 6 is in the form of a ring that surrounds the casing 4. There is a thrust ring 7 extending around and rigidly fixed to the fan case 4. There are also two hollow ring-like members 17 that are rigidly secured to a supporting plate 18 fixed to the aircraft structue. The members 17 are filled with a force transmitting medium 20 which is preferably a body of resilient material such as rubber. The ring structure 7 transmits its loads into the rubber-like medium 20 which in turn transmits it through the ring member 17 to the structure 18. Thus, this patent discloses a load carrying member mounted to the engine which transmits its loads through a yielding material, such as rubber.

U.S. Pat. No. 3,448,945—Ascani, Jr. discloses what is called a "convertible propulsion package", where a conventional engine can be replaced with a VTOL engine and nacelle.

U.S. Pat. No. 3,750,983—Morris shows an engine mounting structure by which a jet engine is mounted to a rigid beam 24. There is a rear mounting linkage (see FIG. 4) which apparently resists both vertical loads and torque loads exerted about the longitudinal axis of the engine. There is a downwardly and forwardly extending linkage structure 34 which resists the tension loads exerted by the engine. Finally, there is a forward support linkage which supports the shroud positioned around the fan.

U.S. Pat. No. 3,848,832—Stanley et al shows an aircraft engine mounting installation where there is a pair of rigid support beams extending forwardly from the front spar. There is an inverted U-shaped transom interconnecting the forward end portions of the beam, and the engine for the aircraft is suspended from the transom structure.

U.S. Pat. No. 3,907,220—Amelio discloses a mounting structure for a jet engine where there are lateral inboard and outboard rear engine mounts. There is a third redundant rear mount provided beneath the engine which does not contribute any significant support for the engine, but which, in the event of failure of either of the two lateral rear mounts, cooperates with the other rear mount to provide a provisional rear support of the engine.

U.S. Pat. No. 4,013,246—Nightingale illustrates an engine mounting system whre there is a forward mount connected to the fan case, and a rear mount connected to the core engine. A pair of struts 58 and 60 are provided to resist the tension loads exerted by the force of the engine.

U.S. Pat. No. 4,044,973—Moorehead shows a mounting structure for an engine that is mounted from a laterally extending support beam. There is a forward mounting member fixedly connected to a forward laterally extending support beam, and this structure extends upwardly and then downwardly in the form of a yoke to connect to the fan case by means of shock absorbing mounts. There is a rear support structure extending from a rear laterally extending beam, and this is connected by a shock mount to the fore engine.

U.S. Pat. No. 4,055,041—Adamson shows a gas turbine engine where the outer nacelle is entirely supported from the engine by means of a webbed structure comprising radially extending struts.

U.S. Pat. No. 4,316,296—Hall et al is directed primarily to a device for connecting the surrounding inlet structure of the engine to the casing. Two toroidally shaped members are positioned between respective annular flanges to allow relative angulation, while allowing loads to be transferred between the two members. Also, a mounting system for the engine is shown where there are fore and aft mounting members, along with downwardly and forwardly extending mounting struts to receive tension loads resulting from thrust of the engine.

U.S. Pat. No. 4,458,863—Smith shows a turbofan engine having a support system somewhat similar to the Hall et al patent mentioned immediately above. The inlet is coupled to the engine fan case by means of a plurality of fluid filled pistons and cylinder assemblies that transmit only axially oriented loads from the inlet to the fan case.

U.S. Pat. No. 4,474,346—Murphy et al shows a cowl structure for a gas turbine engine where there is a protective belt surrounding the fan section.

U.S. Pat. No. 4,555,078—Grognard shows an engine mounting system where there is a flexmount member 2 connecting to the engine by front and rear attachment devices 11 and 12. An upper pylon 8 is connected to the flexmount structure 2, and the engine mounts are housed in the upper pylon 8. The apparatus is arranged so that the engine can operate in a "cowl load sharing mode" where the suspension apparatus is in a locked position. Further, the engine with its cowling can be rigidly secured for repair and servicing when the suspension apparatus is used in its non-free position.

SUMMARY OF THE INVENTION

The present invention enables the load transmitting characteristics of the engine to be properly matched to the load receiving and transmitting characteristics of the structure to which the engine is mounted. More particularly the present invention permits the torque transmitting characteristics of the engine housing to be properly matched with the torque load receiving characteristics of the mounting structure.

The engine mounting assembly of the present invention has a longitudinal axis, a horizontal axis, a vertical axis, a forward end and a rear end. The assembly comprises an engine housing having a longitudinally extending engine axis and adapted to carry transverse loads and thrust loads. The housing also is adapted to carry engine developed torque load and to transmit such torque loads at a predetermined torque transmitting housing location along the engine axis.

There is an engine mounting means operatively connected to the engine housing to carry the transverse loads, thrust loads and torque loads. The engine mounting means comprises first a base support structure adapted to carry the transverse loads and thrust loads and having a predetermined torque load receiving location at which the base support structure is particularly configured at a range to carry the torque loads.

The engine mounting means also comprises a longitudinally extending torque beam having a lengthwise axis and being mounted to said base support structure. The beam has a first beam to housing load transmitting connection means at a first beam to housing connecting location which is adjacent to the torque transmitting location and through which at least a major portion of the beam receives torque loads from the engine housing. There is also a second beam to housing load transmitting connection means at a second beam to housing connecting location which is spaced from the first beam to housing connecting location along the lengthwise axis of the beam. The second beam to housing connection means transmits to said beam no more than a minor portion of the torque loads from the engine housing.

There is a third beam to base structure load transmitting connection means at a third beam to base structure connecting location which is adjacent to the torque load receiving location of the base structure and through which the beam transmits at least a major portion of torque loads received by the beam to the base structure. There is also a fourth beam to base structure load transmitting connection means at the fourth beam to base structure connecting location which is spaced from the third beam to base structure connecting location along the beam axis. The second beam to base structure connecting means transmits to the base structure no more than a minor portion of the torque loads from the beam.

In the preferred form the base structure is a horizontally and laterally extending base structure having an inner portion connected to main aircraft structure and an outer end to which the beam is connected. The two beam to housing connection means are in the preferred embodiments forward and rear locations, and the two beam to base structure connection means are also at forward and rear locations.

In one form, the beam to housing connection means are arranged so that the beam and the engine housing are particularly adapted to be preassembled so as to be connected to, and removed from, the base structure as a unit. Also in this form, the beam to base structure load transmitting connection means are arranged with shock mounting means which are operatively connected to the third and fourth connection means so as to absorb shock loads from the beam to base member.

In another form, the third and fourth beam to base structure load transmitting connections are arranged so that the beam is preconnected to the base support structure, and the engine housing as a separate unit is arranged to be connected to and removed from the beam and said base structure. In this form, the beam to housing connection means are arranged with shock mounting means which are operatively connected to the beam to housing connection means so as to absorb shock loads from the engine housing to the beam.

One preferred form of the beam is that it comprises two side sections and a middle section, with the two side sections and the middle section being rigidly interconnected with one another. The side and middle sections of the beam are configured in a manner that the middle section forms with either of the side sections a configuration which in transverse section is a closed structure, whereby in the event of failure of one of said side sections, the middle section of the beam is able to function as a torque transmitting means with the other of said side sections of the beam. In the preferred form, the middle section of the beam comprises a plate member positioned between the first and second sections.

The preferred specific construction of the side sections of the beam is that each side section in cross-section has a side plate portion and two inwardly extending leg portions which are adjacent to the middle section. The inner portions of the legs have upper and lower flanges by which the side sections are connected to the middle section.

Also, in the preferred form, the beam has a horizontal transverse beam axis and a vertical beam axis. The beam is positioned between the engine housing and the base structure in a direction along said horizontal transverse beam axis. The beam is arranged so as to be more resistant to bending vertically, and less resistant to bending horizontally, whereby the beam is able to absorb transverse horizontal shock loads imparted thereto.

In some of the preferred embodiments, the torque transmitting housing location is at a rear portion of the engine housing, and the first beam to housing connection means is at a rear portion of the beam. The third beam to base structure load transmitting connection means is at a forward portion of the beam and connects to a forward portion of the base structure.

In a preferred form, the base support structure comprises a front spar and a rear spar. The assembly is characterized in that both transverse loads and torque loads are transmitted into the front spar from the third connection means, and primarily transverse loads are transmitted into said rear spar from the fourth connection means.

In a further preferred form, the base support structure further comprises a mid spar, and the assembly further has a fifth beam to base structure connection means which is a fail safe connection, in that during normal operation, the fifth connection means does not transmit any significant loads to the mid spar. However, upon failure of one of the third and fourth connection means, the fifth connection means becomes operative to transmit loads into the mid spar.

More specifically, in a preferred form, the first connection means transmits vertical, horizontal and torque loads into the beam. The second connection means transmits vertical and horizontal loads into the beam. The third connection means transmits vertical, horizontal and torque loads from the beam into the front spar, and the fourth connection means transmits vertical and horizontal loads into the rear spar.

In one of the several embodiments, the torque transmitting housing location is at a forward portion of the engine housing, and the first beam to housing connection means is at a forward portion of the beam.

Further, in the preferred embodiments, various configurations of connection means are shown.

One such connection means comprises a first connecting structure defining first and second spaced shock isolating recesses, with first and second shock isolation means positioned in the recesses. There is a second connecting structure. First and second bolt means are provided, each having a first portion extending through the first and second recesses and having an operative shock isolating connection with the first connecting structure through the first and second shock isolation means. The first and second bolt means each has a second portion connecting to the second connecting structure. Thus, shock loads imparted to one of the connecting structures are transmitted through the first and second shock isolation means to the other of the connecting structures, thereby isolating transmission of shock loads.

In the preferred form of this particular connection means, at least one of the first and second shock isolation means comprises first and second shock isolation portions positioned in their related shock isolating recess with the first and second shock isolation portions reacting laterally directed loads. Further, there is a third shock isolation portion positioned to react vertical loads. More specifically, there is a shock isolation insert positioned in at least one of the first and second recesses. This insert defines first and second laterally spaced insert recesses receiving the first and second portions of the respective shock isolation means. The related bolt means extends through the first and second portions and through the shock isolation insert, in a manner that shock loads imparted on the first connecting structure are imparted through the first and second portions of the related shock isolation means and through the shock isolation insert to the second connecting structure. The specific configuration of the shock isolation insert is that there is a peripheral wall structure having a middle plate defining the first and second insert recesses for the shock isolation portions, with the middle plate having a through opening to receive related bolt means.

Yet another connection means comprises a beam enclosing mounting structure, with the mounting structure defining top, bottom, and side shock isolating mounting locations. The connection means further comprises top, bottom and side shock isolating means positioned at each of said shock isolating locations. The mounting structure comprises a first stationary portion mounted to stationary structure, and a second movable portion movable between a closed load bearing position and an open position. Thus, by moving the movable portion, access can be obtained to each of said shock isolation means for replacement. In this specific connection means, the mounting structure has recesses at the shock isolating mounting locations to receive respective shock isolation means, with the shock isolation means being positioned in respective recesses. In the specific form of this connection means, the first portion of the mounting structure comprises a laterally extending member and a vertically extending member rigidly interconnected thereto. The second portion of the mounting structure comprises a second laterally extending member and a second vertically extending member which are movable relative to the first laterally extending and vertically extending members so as to be able to be moved to an open position out of engagement with the beam.

Yet another connection means of the present invention comprises a first connecting structure means and a second connecting structure means, with upper and lower laterally extending links interconnecting said first and second connecting structure means. There is a third vertically oriented link interconnecting the first and second connecting structure means, with at least one of the links having a connecting location at which the first and second connecting structure means has in addition a fail safe connection to react transverse loads. Thus, if there is a failure of one of said links, the failsafe connection can become operative to react transverse loads. Specifically, the failsafe connection comprises first ear mounting means positioned on the first mounting structure means, and second ear mounting means on the second mounting structure means, with said first and second ear mounting means being in fail safe operating engagement with one another.

Yet another configuration of one of the connection means comprises a first mounting structure means and a second mounting structure means, with a third intermediate mounting structure means pivotally connected to the first mounting structure means about a first axis, and connecting through shock isolation means at a second pivot location to the second mounting structure means. More specifically, the third mounting structure means has upper and lower bolt means mounted in shock isolation members to the second mounting structure means. Then portions of the bolt members are pivotally connected to the second mounting structure means.

Another connection means provided in the present invention comprises first and second mounting structure means. The first mounting structure means has an intermediate connection to the second mounting structure means through a shock isolation means to resist vertical and lateral loads through the shock isolation means. There are upper and lower laterally extending links having fail safe connections between the first and second mounting structure means. Thus, under circumstances where either of the upper and lower links comes into load bearing operation, the first intermediate connection and the link that comes into load bearing operation resist torque loads exerted between the first and second mounting structure means. The specific configuration of the shock isolation means is that it comprises a shock isolation member having a central opening to receive a connector that extends through the opening in the shock isolation means and is connected to the first mounting structure means. The shock isolation member is positioned within a recess in the second mounting structure means.

Other features of the invention will become apparent from the following detailed description.

BRIEF DESCRIPTION OF THE DRAWINGS

FIG. 1 is a top plan view of a first embodiment of the engine mounting assembly of the present invention;

FIG. 2 is a sectional view taken along line 2—2 of FIG. 1, illustrating a beam to base structure connection where transverse loads, thrust loads, and torque loads are transmitted from the beam into the front spar;

FIG. 2A is a top plan view of the connection shown in FIG. 2;

FIG. 2B is a sectional view of a shock isolator container used in the connection of FIG. 2, with the sectional view taken through a center axis;

FIG. 2C is an end view of the shock isolator housing shown in FIG. 2C;

FIG. 3 is a sectional view taken along line 3—3 of FIG. 1, showing a beam to engine housing connection to transmit vertical and lateral loads, but not horizontal loads, and also incorporating a failsafe connection;

FIG. 4 is a sectional view taken along line 4—4 of FIG. 1, showing a beam to mid-spar failsafe connection which does not transmit any loads during normal operation of the engine mounting assembly;

FIG. 5 is a sectional view taken along line 5—5 of FIG. 1, showing a beam to rear spar connection arranged to resist vertical and lateral loads, but not torque loads nor thrust loads;

FIG. 6 is a view taken along line 6—6 of FIG. 1, showing a rear beam to engine housing connection to resist vertical, lateral and torque loads, but not thrust loads;

FIG. 16 is a sectional view taken along line 16—16 of FIG. 15, showing a front shock-absorbing beam to front spar connection, which is substantially the same as that shown in FIG. 2;

FIG. 17 is a sectional view taken along line 17—17 of FIG. 15, showing a front beam to engine housing connection to resist vertical, side and torque loads transmitted from the engine housing to the beam;

FIG. 18 is a beam to mid-spar failsafe connection which is substantially the same as that shown in FIG. 4;

FIG. 19 is a sectional view taken along line 19—19 of FIG. 15, showing a beam to rear spar connection, where vertical and lateral loads are resisted, but not torque loads nor thrust loads;

FIG. 23 is a sectional view taken along line 23—23 showing a beam to front spar shock absorbing connection, and also a beam to engine housing connection, where the beam to front spar connection resists loads in substantially all directions, including torque loads, while the beam to engine housing connection resists only lateral and vertical loads, there also being a failsafe connection between the engine housing and the beam;

FIG. 24 is a view taken along line 24—24 of FIG. 22, showing a beam to mid-spar failsafe connection which during normal operation does not transmit any loads into the mid-spar;

DESCRIPTION OF THE PREFERRED EMBODIMENTS

Figure 7:
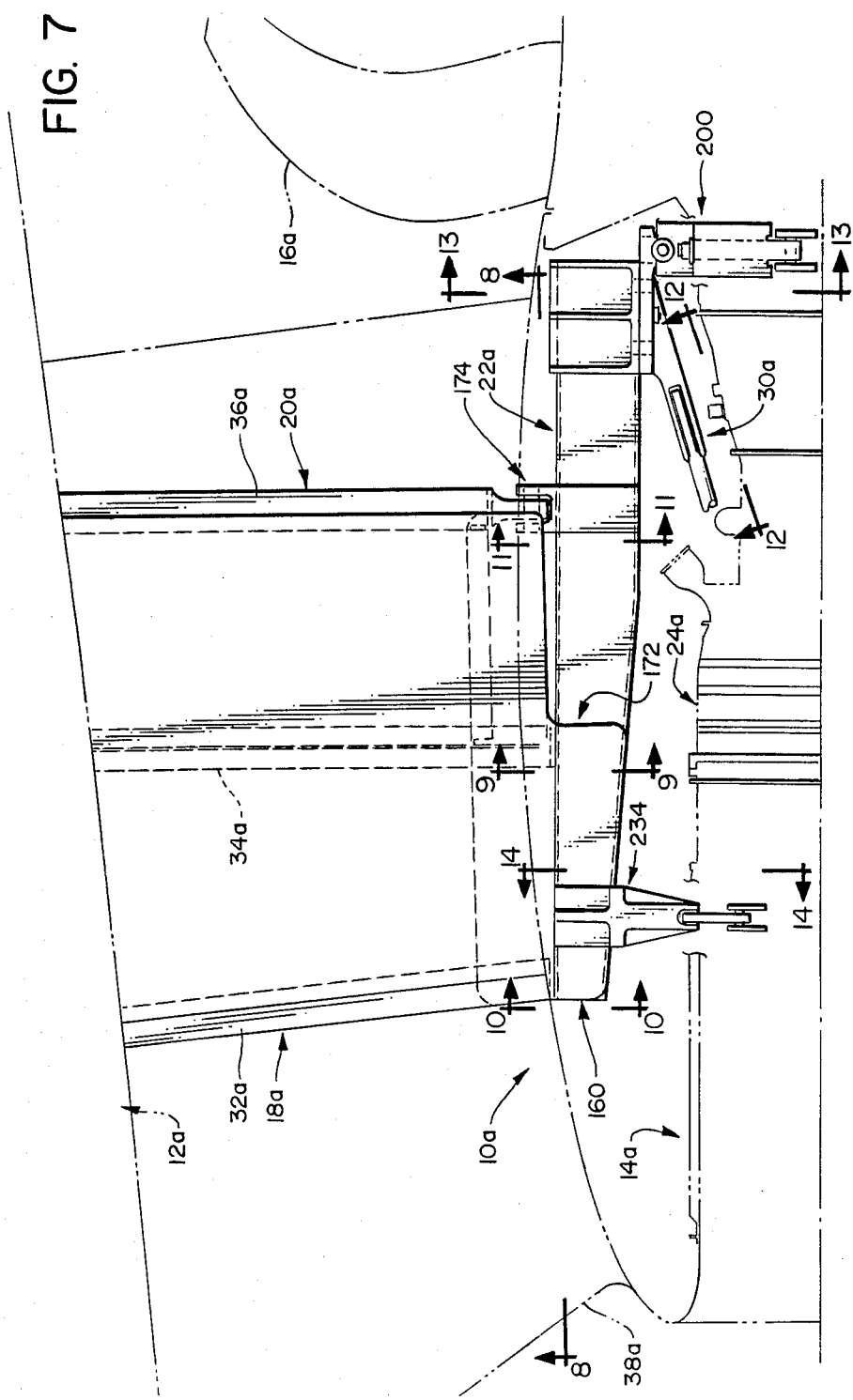
FIG. 7 is a top plan view, similar to FIG. 1, showing a second embodiment of the present invention.
Figure 8:
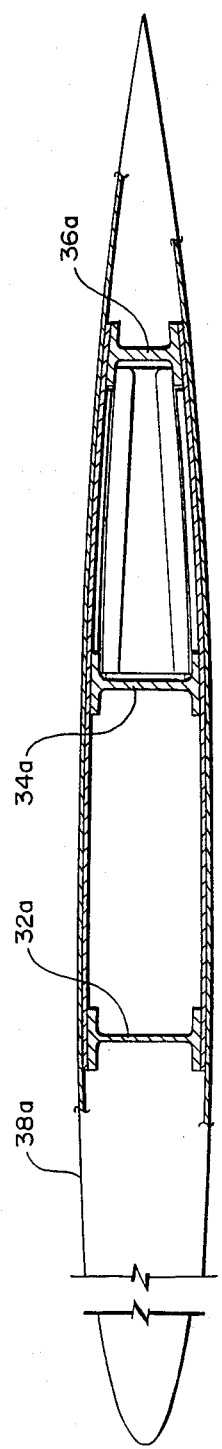
FIG. 8 is a sectional view taken along line 8—8 to illustrate the configuration of the mounting strut.

The engine mounting assembly 10 of the first embodiment of the present invention is shown in FIGS. 1 through 6. This assembly 10 is shown mounted to the rear side structure of a fuselage 12 of the airplane. There is a propfan or turboprop engine 14 of a pusher configuration, having a pair of counter rotating blades, the front blade being shown at 16. The engine 14 is connected to the fuselage structure 12 by means of a mounting apparatus or means generally designated 18, this in turn comprising a mounting strut or base structure 20 and a longitudinal beam 22. The manner in which the beam 22 functions is considered to be critical in the present invention, and this will be described in more detail later herein.

As discussed previously herein under "Background Art", the loads resulting from, and generated by, the engine 20 are imparted into the engine housing (indicated in broken lines in FIG. 1 at 24). It is believed that a clearer understanding of the present invention will be obtained by first describing generally the manner in which the loads are transmitted from the engine housing 24, through the beam 22 and into the base structure 20 in the first embodiment, and then disclosing the various mounting connections in more detail.

With further reference to FIG. 1, there are three main load carrying connections between the beam 22 and the engine housing 24. First, there is a forward beam to engine housing connection 26 (illustrated in FIG. 3) which is arranged to transmit vertical and lateral loads (which collectively can be referred to as "transverse loads") from the engine housing 24 to the beam 22, but not to resist torque loads or thrust loads. However, in a modified configuration, a minor portion of the torque loads could be transmitted by this connection 26. Further, this connection 26 has a failsafe connection. There is a rear beam to engine housing connection 28 (shown in FIG. 6), and this connection 28 is designed to resist vertical, lateral and torque loads between the engine housing 24 and the beam 22, but not to transmit thrust loads. Then there is a thrust connection 30 which transmits thrust loads from the engine housing 24 to the beam 22 (these thrust loads being exerted in a forward direction during normal operation, and in a rearward direction during thrust reversal).

There are also three force transmitting connections between the beam 22 and the strut or base structure 20. This base structure 20 is, as shown herein, made up of three laterally extending spars, namely a forward spar 32, a mid-spar 34 and a rear spar 36. These spars 32, 34 and 36 are interconnected by suitable forward to rear bracing members, and one such bracing member (not shown herein for ease of illustration) could be provided at the outer ends of the spars 32, 34 and 36. The entire base structure 20 is contained in a suitable aerodynamically contoured faring structure (indicated somewhat schematically in broken lines at 38).

There is a front beam to base structure connection 40, by which the beam 22 is connected to the lateral outer end of the forward spar 32 (shown in FIG. 2). This front connection 40 is a shock absorbing connection which transmits vertical loads, lateral loads, torque loads and also thrust loads from the beam 22 into the front spar 32. There is a middle failsafe beam to base structure connection 42, by which the beam 22 can become connected to the mid spar 34 in load bearing engagement (this occurring when one of the other beam to base structure connection fails). This connection 42 is shown in FIG. 4. There is a third beam to base structure connection 44 (shown in FIG. 5) by which the beam 22 is connected to the rear spar 36. This connection 44 transmits vertical and lateral loads from the beam 22 to the rear spar 36, but no torque loads nor thrust loads.

However, in a modified configuration a minor portion of the torque loads could be transmitted at this connection 44.

With the foregoing in mind, let us now examine briefly the operation of this first embodiment. The thrust developed by the engine 14 is transmitted from the engine housing 24 through the thrust connection 30 into the rear end of the beam 22. The beam 22 in turn transmits this thrust load through the front shock absorbing beam to base structure connection 26 (shown in FIG. 2). With regard to the vertical and lateral loads from the engine 14 (these loads resulting primarily from the weight of the engine and "G" forces) are resisted by the forward beam to engine housing connection 26 and the rear beam to housing connection 28. The beam then transmits these vertical and horizontal loads through the forward beam to base structure connection 40 (see FIG. 2) and through the rear beam to base member connection 44 (see FIG. 5).

With regard to the torque loads, it should first be pointed out that these torque loads can be rather severe in the event that one or more of the propeller blades becomes inoperative. These torque loads are transmitted through the rear beam to engine housing connection 28 into the extreme rear end of the beam 22. These loads are then reacted through the lengthwise axis 46 of the beam 22 into the forward beam to base structure connection 26, which in turn transmits these torque loads into the front spar 32. If there is a failure in the forward beam to base structure connection 40, then the middle beam to base structure connection 42 becomes operative to resist the torque loads. In addition, as will be discussed later herein, this middle beam to base structure connection 42 (see FIG. 4) is able to function to resist horizontal and vertical loads, as well as thrust loads.

From the above description it can be appreciated that the vertical and lateral loads from the engine 14 are transmitted from the engine housing 24 at forward and rear locations into the beam 22, which in turn transmits these vertical and lateral loads at forward and rear locations into the front spar 32 and the rear spar 36. However, the torque loads are reacted from the engine housing 24 at a rear location (i.e. the rear beam to engine housing connection 28) through the length of the beam 22 to the forward beam to base structure connection 40 into the front spar 32. In the event of failure of the forward connection 40, the torque loads then are transmitted to the mid-spar 34 through the middle failsafe connection 42. The rear spar 36 which in this configuration would be made somewhat smaller in its vertical dimension due to the aerodynamic requirement, would not be subjected to the torque loads.

In this first embodiment, the assembly 10 is arranged in a manner that the beam 22 is preconnected to the engine housing 24. Then the engine 14, with the beam 22 fully connected thereto, can be mounted as a unit to the strut or base structure 20.

There will now be a more detailed description of the various components of this first embodiment.

With reference to FIG. 2, it can be seen that the beam 22 is made of three components, namely inside and outside elongate hat-shaped sections 48 and 50, respectively, and a central vertically aligned plate 52. Each hat section has upper and lower flanges 54 and 56, and the upper and lower edge portions of the plate 52 fit between these flanges 54 and 56. Bolt connections (indicated at 58) are made through the upper flanges 54 and lower flanges 56 to rigidly interconnect the hat-shaped sections 48 and 50 and the plate 52 together. With this beam being made up of three separate components, if there is a structural failure in one of the beam components 48, 50 or 52, the other beam components 48, 50 or 52 can carry the loads imparted thereon since any two of the beam components 48, 50 or 52 forms, in cross sectional configuration, a closed beam construction since any two of the beam components 48, 50 or 52 forms, in cross section, a closed beam construction. Alternatively, it may be possible to form the beam 22 as a one-piece hollow section, provided safelife design criteria can be used.

The beam 22 is arranged structurally in a generally box-like configuration, with its vertical dimension somewhat greater than its lateral dimension. This mount beam 22 is arranged so that it can act as an elastic shock absorber by absorbing the torsion loads along its length. Further, it is a simple yet effective means of absorbing the impact of a moving mass, which might occur from the sudden failure of a propeller blade at the root, internal explosion of the engine, etc. Since the lateral (i.e. width) dimension of the beam is somewhat less than its vertical dimension, the beam 22 can act as a spring beam, or a cantilever beam, about its less rigid axis so as to absorb impact energy.

To further describe the forward beam to base structure connection 40, there is a generally vertically aligned mounting block 60 to which are connected upper and lower cone bolts 62, with these cone bolts 62 providing a connection to upper and lower mounting flanges 64 and 66 that are formed integrally with the front spar 32. Each cone bolt 62 comprises a cylindrical shank portion 68 which extends through the block 60 and has an outer threaded end to receive a retaining nut 70. The inner end of each shank 68 is connected to a cone-shaped portion 72 having an outwardly facing annular bearing surface 73. This cone-shaped portion 72 fits into a matching frusto-conical opening 74 formed in the related spar mounting flange 64 or 66. Then the cone bolt 62 has an innermost cylindrical threaded end to receive an inner retaining nut 76.

Each cone bolt 62 is connected to the block 60 in a shock absorbing connection. More specifically, the upper and lower portions of the block 60 are each formed with upper and lower recesses 77, with each of these recesses 77 receiving a shock mounting insert 78. The upper recess 77 opens in an upward direction and the lower recess 77 opens in a downward direction so that the inserts 78 can be placed in the recesses 77. As shown in FIGS. 2b and 2c, each insert 78 comprises a rectangular sidewall structure 79 having cylindrically shaped open end portions. There is a plate or web member 80 which extends entirely across the cylindrical sidewall structure 79 at an axially middle location so as to define with the sidewall structure 79 inside and outside cylindrical openings 80a and 80b, respectively. In addition, the web 80 is provided with a middle through opening 80c to receive the cone bolt shank 68.

To provide the shock mounting, there are inside and outside cylindrical shock isolating or absorbing members 81a and 81b, respectively, fitting in respective openings 80a and 81b. Each of these shock isolators or mounts 81a and 81b is formed with a center through opening to receive the cone bolt shank 68. Further, each shock isolator 81a and 81b has within its opening a related spacing sleeve 81c which is made of a rigid material and which surrounds a respective portion of the cone bolt shank 68. A washer 81d is positioned between the nut 70 and the outside sleeve 81b, and a second washer 81e is positioned between the cone bolt face 73 and the inside spacing sleev 81c. There is for each upper and lower shock mount assembly a third shock isolator 81f, with the upper shock isolator 81f being positioned immediately below the upper insert 78, and the lower shock isolator 81f being positioned immediately above the lower insert 78.

These shock isolators 81a, 81b and 81f can be made as blocks of rubber or other elastomeric material, and other types of shock absorbers could be used, such as fluid, metallic or non-metallic materials.

To rigidly connect the mounting block 60 to the beam 22, there is fixedly connected to the outer hat section 50 of the beam 22 a vertically oriented outwardly extending mounting plate 82. This plate 82 has inner flange sections 84 which are fixedly attached to the beam 22, this being accomplished by the aforementioned bolt connections 58. The plate 82 is in turn connected to the block 60 by fasteners at 85. Torque from the beam 22 is transmitted through the bolts 85 and through the cone bolts 62 to the front spar 32.

To review briefly the functioning of the front beam to base structure connection 40 shown in FIG. 2, it can be seen that the beam 22 has a rigid connection to the mounting block 60 through the mounting plate 82. The block 60 in turn has a shock absorbing connection to the mounting flanges 64 and 66 of the front spar 32, this being accomplished by the cone bolts 62 and the shock absorbing members 81a, 81b, and 81g and the cone bolts 62. More specifically, each outer nut 70 bears against the outer spacing sleeve 81c, and the annular surface 73 of each cone bolt frusto-conical section 72 bears against the inner spacing sleeve 81c. Each spacing sleeve 81c in turn bears against the middle web portion 80 of its insert 78 in a manner that any lateral shocks would be absorbed through the insert 78 and against one or the other of the shock isolators 81a and 81b. Vertical loads are reacted by the shock isolators 81g.

It is readily apparent from observing FIGS. 2, 2A, 2B and 2C that the shock isolators 81a, 81b and 81f can easily be removed and replaced. In general, it is quite difficult to calculate exactly the spring characteristics required for the shock isolators. Accordingly, quite often in ground test and also in flight test, the characteristics of the shock isolators are ascertained experimentally, and there will be substitutions of the shock isolators to attain the proper balance of characteristics. In this first embodiment, as well as the other embodiments, the various shock isolators (as shown at 81a, 81b and 81f in FIG. 2 of the first embodiment) can easily be removed and replaced.

In the pre-assembly of the present invention, the beam 22 is attached to the mounting block 60, and the mounting block 60 in turn has the cone bolts 62 already mounted therein. To install the engine 14 and beam 22 to the strut or base structure 28, the frusto-conical portion 72 of the cone bolts 62 (which are already connected to the beam 22) are inserted into the openings 74 in the upper and lower spar flanges 64 and 66, and then the retaining nuts 76 are threaded onto the inner ends of the cone bolts 62 to complete the connection. It can be seen that this shock absorbing front beam to base structure connection 40 is such that vertical, horizontal, torque and thrust loads can all be transmitted from the beam 22 into the block 60 and thence into the front spar 32.

Reference is now made to FIG. 3 which shows the front beam to engine housing connection 26. There is a vertically aligned, outwardly extending mounting plate 88 having upper and lower mounting flanges 90 to rigidly connect to the beam 22. Connected to the plate 88 by spherical bearings 92 are upper and lower links 94 which extend outwardly and divergently, with the upper link 94 extending outwardly in an upward slant, and the lower link 94 extending outwardly in a downward slant. The outer ends of these links 94 connect to spherical bearings at 96. The engine housing (represented rather schematically by a sphere at 24) has fixedly attached thereto upper and lower ears 98 to provide the spherical bearing connections 96. The engine housing 24 also has at its mid-height an inwardly extending ear 100 which overlaps with a central outer portion of the plate 88. The plate 88 has an oversized opening 102 to receive a failsafe bolt (indicated at the intersection of two lines at 104). Although the middle ear 100 is shown only as a single member, it is to be understood that this ear 100 could be made as two ears which fit on opposite sides of the plate 88. Alternatively, the ear 100 could fit in a slot defined by two sides of the plate 88.

In normal operation, there is no load bearing connection between the middle ear 102 and the plate 88, and loads are taken only through the upper and lower links 94. If one of the links 94 should fail, then the hole and bolt failsafe connection 102 and 104 would come into operation so as to form an operative connection between the engine housing 24 and the beam 22. It can be seen that in normal operation, the connection provided by the two links 94 resist only lateral and vertical loads, but not torque loads.

Reference is now made to FIG. 4 to describe the middle failsafe beam to base structure connection 42. There is a support fitting 106 fixedly connected to the beam 22. This fitting 106 actually has two spaced plates which in a top plan view provide the fitting 106 with a U-shaped configuration defining a slot to receive an end fitting 108 that is fixedly connected to (or made integral with) the mid-spar 34. The plates that made up the support fitting 106 are provided with upper and lower oversized openings 110 to receive upper and lower bolts, indicated schematically at 112. In normal operation, because of the oversizing of the holes 110, no loads are transmitted from the support fitting 106 into the mid-spar end fitting 108. However, in the event of failure of one of the cone bolts 62 of the front beam to base structure housing there will be a small amount of movement of the beam 22 which would bring the bolts 112 into bearing engagement so that loads would be transmitted from the beam 22 into the mid-spar 34. This mid-spar connection 42 is intended primarily to impart the torque loads into the mid-spar 34. However, it can readily be seen that this mid-spar connection 42 would also resist horizontal, vertical and thrust loads.

When the beam 22 and the engine 14 are to be connected to the strut or base structure 20, the support fitting 106 is positioned so that it receives the end fitting 108 of the mid-spar 34, and the bolts 112 are then inserted into the oversized openings 110.

FIG. 5 illustrates the rear beam to base structure connection 44. The outer end of the rear spar 36 has a right-angle fitting made up of an upwardly extending arm or plate 114 and a laterally extending plate or arm 116. There is a right-angle shaped retaining member 118 having a vertical arm 120 that is pivotally connected at 122 by its lower end to the outer end of the arm 116. This member 118 has an upper inwardly extending arm 124, the inner end of which is connected by a bolt or bolts 126 to the upper end of the plate or arm 114. This bolt 126 can be a barrel bolt, where the inner threaded end of the bolt 126 threads into a nut member 128 positioned in a recess in the arm 124.

When the engine 14 with the beam 22 mounted thereto is to be attached to the strut or base structure 20, the bolt 126 is disengaged, and the retaining member 118 is moved to an open position so as to receive the beam 22. When the engine and the beam 22 are in place, then the retaining member 118 can be swung into its retaining position, as shown in FIG. 5, and the bolt or bolts 126 used to connect the member 118 with the arm 114.

It will be noted that each of the arms or plates 114 and 116 are formed with recesses to receive shock-absorbing members 130. Further, the arms 120 and 124 have recesses to receive further shock absorbing members 132. These shock absorbing members 130 and 132 are positioned so that the beam 22 is centered within the arms 114, 116, 120, and 124, without actually having contact with any of these members 114, 116, 120 and 124. These shock absorbing members 130 and 132 have sufficient elasticity so that they will not absorb to any significant extent any torsional loads transmitted through the beam 22. However, the vertical and lateral loads are resisted.

FIG. 6 illustrates the rear beam to engine housing connection 28. There is a mounting plate 134 fixedly connected to the beam 22, and there are provided upper and lower links 136 extending between the mounting plate 134 and the engine housing 24. More specifically, each link 136 has an inner spherical connection 138 by which it connects to the plate 134 and an outer spherical connection 140 by which it connects to a respective one of two upper and lower ears 142 fixedly connected to the engine housing 24. The spherical connections 138 and 140 permit universal pivot movement of the links 136 relative to the plate 134 and the engine housing 24.

There is a third vertical link 144 having a lower connection at 146 to a laterally and inwardly extending ear 148 fixedly connected to the engine housing 24. The upper end of this vertical link 144 connects at 150 to the mounting plate 134. In addition, the middle outer portion of the plate 134 can be provided with outwardly extending ears 152 having oversized openings 154 to receive a failsafe bolt or the like that would be connected to the ear 148. Thus, in the event of failure of any of the links 136 or 144, the failsafe connection between the ears 148 and 152 would become operative.

It can be seen from examining the rear beam to engine housing connection 28 that this connection 28 resists vertical, lateral and torque loads. However, this connection 28 does not resist any thrust loads.

Finally there is shown in FIG. 1 the thrust link 30 which transmits both forward and reverse thrust loads from the engine housing 24 into the rear end of the beam 22. This thrust link is substantially similar to a thrust link 30a disclosed in FIG. 12, relating to the second embodiment, so no detailed description of this thrust link will be given relative to the first embodiment.

In this first embodiment, the engine 14 is installed by first connecting the beam 22 to the engine housing 24, as described previously herein. After this, the engine 14 with the beam 22 already attached thereto is connected to the strut or base structure 20.

A second embodiment of the present invention is illustrated in FIGS. 7 through 14. Components of this second embodiment which are similar to components of the first embodiment will be given like numerical designations with an "a" suffix distinguishing those of the second embodiment.

The assembly 10a is, as in the first embodiment, mounted to a fuselage 12a, and there is a turboprop or propfan engine 14a having counter rotating blades 16a with the mounting means 18a comprising a strut or base ptructure 20a and a beam 22a. There is an engine housing 24a by which loads are transmitted from the engine 14a through the beam 22a to the base structure 20a. Further, the base structure 20a comprises front, middle and rear spars 32a, 34a and 36a, respectively.

This second embodiment shown in FIGS. 7 through 14 differs from the first embodiment (shown in FIGS. 1 through 6) in that the beam 22a is arranged to be a permanent part of the strut or base structure 20a. Further, the shock absorbing mounts are located between the beam 22a and the engine housing 24a. The beam 22a of the second embodiment differs in structure from the beam 22 of the first embodiment. This second embodiment is similar to the first embodiment in that the torque loads from the engine 14a are transmitted at the rear of the engine housing 24a into the rear portion of the beam 22a. Further, the first and second embodiments are similar in that the thrust link 30a of the second embodiment is substantially the same as the thrust connection 30 of the first embodiment. The second embodiment differs from the first embodiment in that instead of transferring the torque loads from the beam 22a only to the front spar 32a, these thrust loads are transmitted to both the front spar 32a and the mid spar 34a.

There will now be a more detailed description of this second embodiment.

Figure 9:
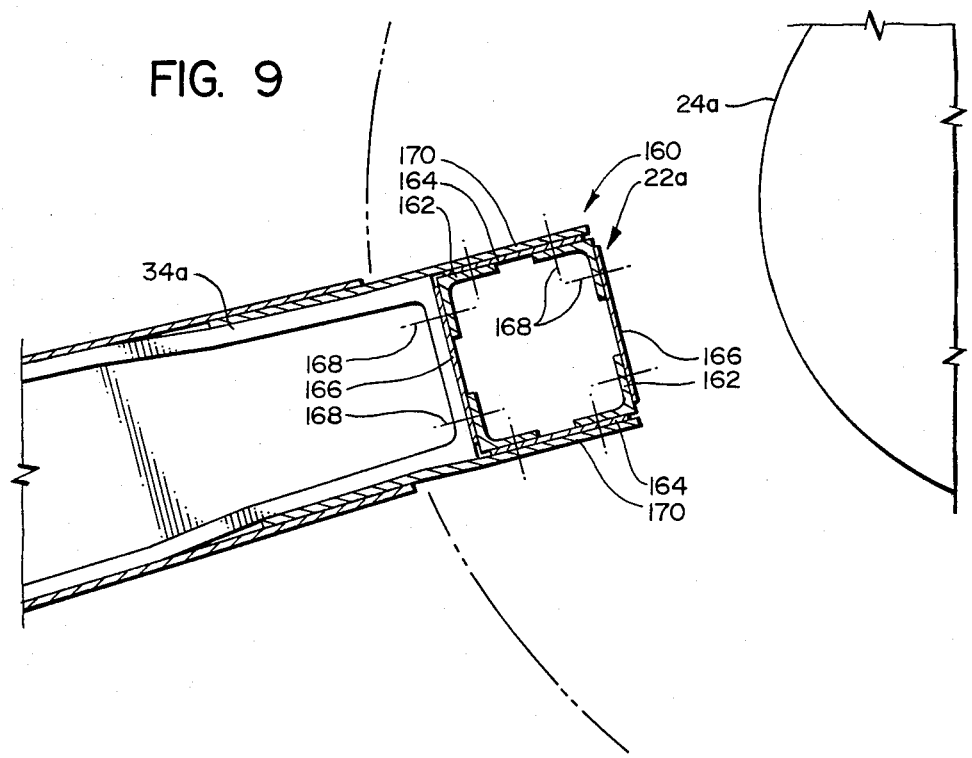
FIG. 9 is a sectional view taken along line 9—9 of FIG. 7, showing a beam to mid-spar connection which is a substantially rigid connection.

FIG. 9 illustrates a beam to mid-spar connection. It can be seen that the beam 22a has a cross-sectional configuration of four right-angle corner sections 162 which extend the length of the beam and are interconnected by top and bottom plates 164 and two side plates 166. As shown herein, there are bolt connections 168, but other means of connecting these components 162–166 could be used.

It can be seen that this mid-beam to base structure mount 160 is fixedly connected to the mid-spar 34a. As shown herein, there are upper and lower spar plates 170 which fit above and below the beam 22a and are connected thereto through the bolt connections 168. The inside face of the beam 22a also is connected to the mid-spar 34a through the bolt connections 168. Thus, the beam 22a is able to react vertical, lateral, torque and thrust loads into the mid-spar 34a.

Figure 10:
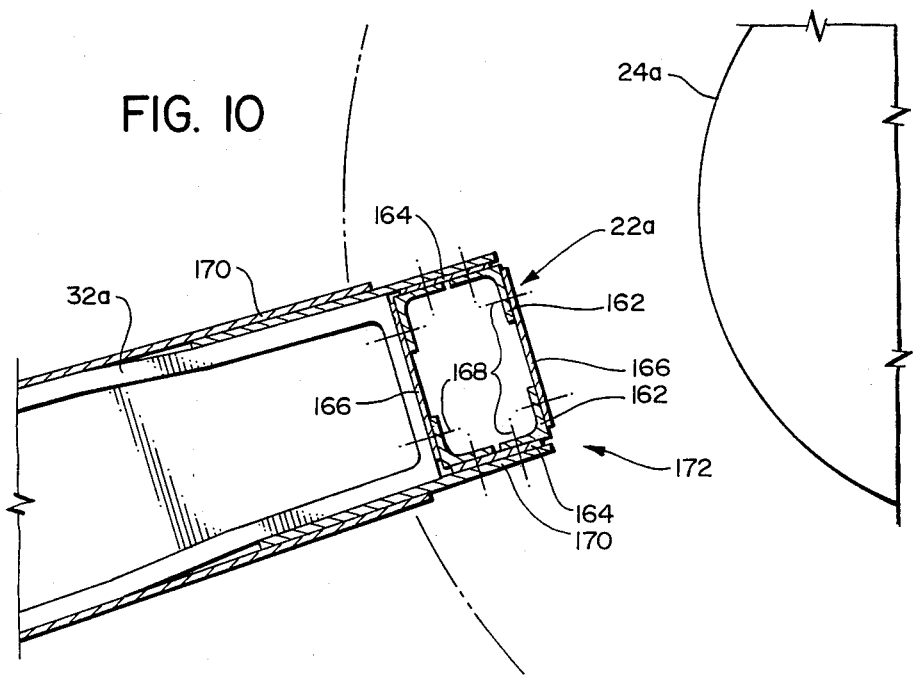
FIG. 10 is a sectional view taken along line 10—10 of FIG. 7, showing a beam to front spar connection, this being a rigid connection.

FIG. 10 shows the front beam to base connection 172, where the beam 22a is fixedly connected to the front spar 32a. This connection 172 is substantially the same as the mid-spar connection 160, so there will be no detailed description of this connection 172. It is readily apparent that vertical, side, torque and thrust loads can be reacted from the beam 22a to the front spar 32a through this connection 172, in the same manner as these loads are transmitted through the mid-spar connection 160.

Figure 11:
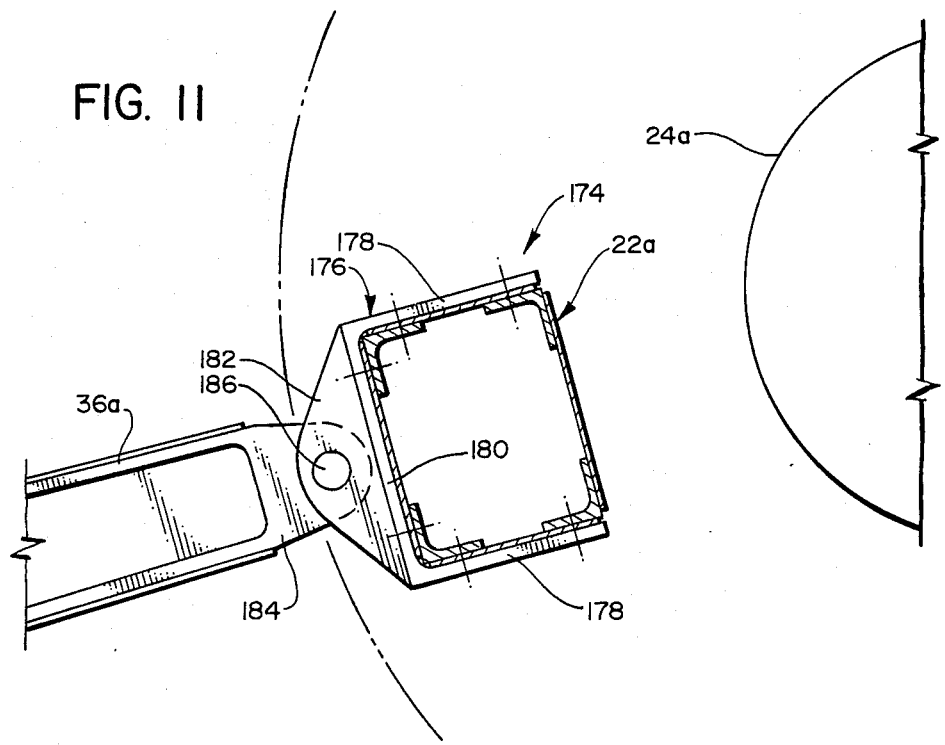
FIG. 11 is a sectional view taken along line 11—11 of FIG. 7, showing a beam to rear spar connection which transmits vertical and lateral loads, but no torque loads.

FIG. 11 shows the rear beam to base structure connection 174. There is a mounting bracket comprising a U-shaped member 176 comprising upper and lower plates 178 and an inside side plate 180. There are a pair of ears or connecting plates 182 rigidly attached to, and extending inwardly from, the inner plate 180, and these ears 182 receive a nose portion of the rear spar 36a. The connection between the plates 182 and the spar nose portion 184 is a pivot connection at 186. Thus, it is apparent that this rear connection 174 will react vertical and side loads into the rear spar 36a, but not torque loads. Also, thrust loads would not be reacted through this connection 174.

Figure 12:
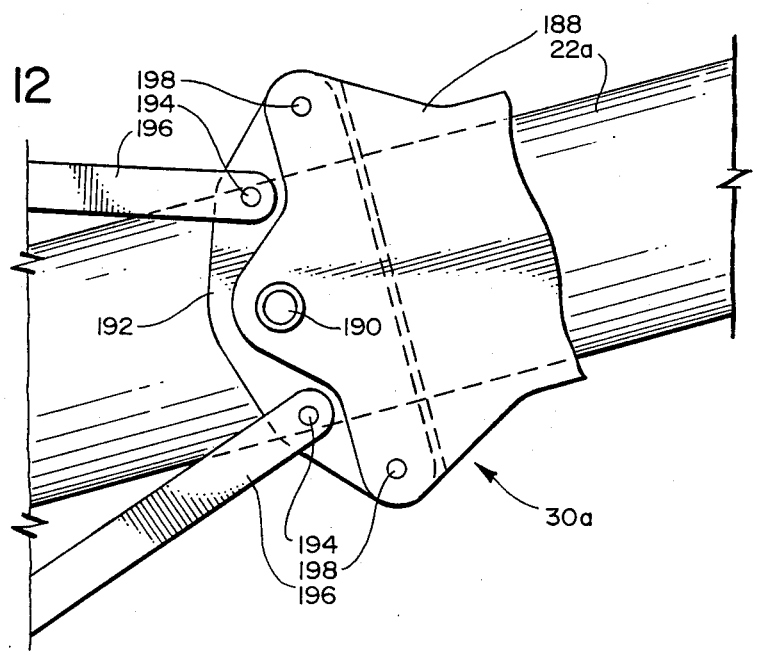
FIG. 12 is a view taken along line 12—12 of FIG. 7, showing a portion of a beam to engine housing thrust link connection to resist both forward and reverse thrust loads exerted by the engine.

A portion of the thrust connection 30a is illustrated in FIG. 12. As indicated previously, this thrust link or thrust connection 30a is substantially the same as the thrust connection 30 of the first embodiment, which was not disclosed in any detail in the description of the first embodiment. This thrust link 30a comprises a main bearing plate 188 fixedly connected to the beam 22a. This plate 188 has a central pivot connection at 190 to a second plate 192. The plate 192 in turn connects at pivot locations 194 to a pair of thrust links 196 that connect to the engine housing 24a.

In addition, there are two failsafe connections 198 located on opposite sides of the center connection 190. Each failsafe connection 198 comprises an oversized hole made in the plate 188, with a fastener interconnecting the plate 192 with the plate 188 at the two oversize hole locations 198. The forward ends of the thrust links 196 connect to the engine housing 24a in a conventional manner. It is apparent from analyzing the structure of the thrust link shown in FIG. 12 that these links 196 resist both forward thrust loads (for normal aircraft operation) and also rearwardly directed thrust loads (occuring during thrust reversal).

Figure 13:
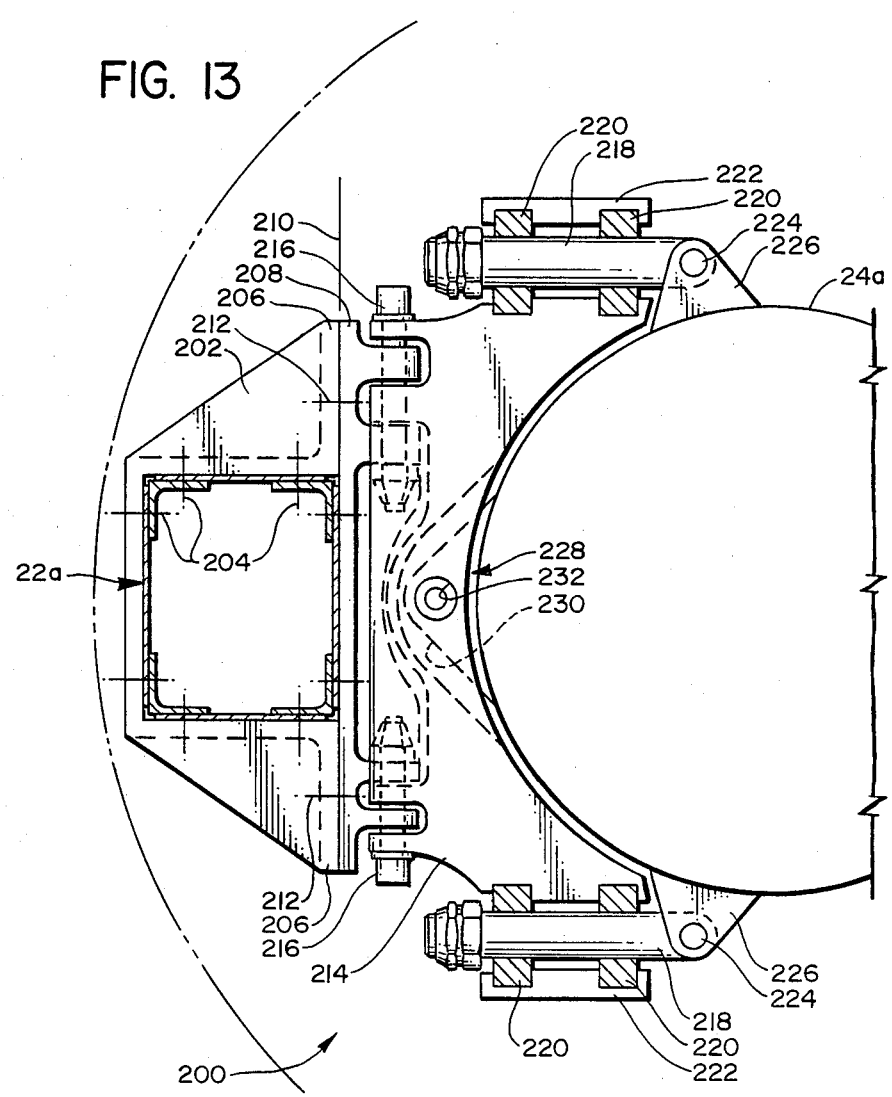
FIG. 13 is a view taken along line 13—13 of FIG. 7, showing a shock-absorbing rear beam to engine housing connection to resist vertical, lateral and torque loads imparted by the engine housing to the beam.

FIG. 13 illustrates a rear beam to engine housing connection 200. This connection 200 is similar to the rear beam to engine housing connection 28 of the first embodiment in that this connection 200 resists vertical, lateral and torque loads, but not thrust loads. However, the specific construction is somewhat different.

There is a beam mount fitting 202 rigidly connected to the beam 22a by bolt connections 204. This fitting 202 has a U-shaped configuration and has upper and lower outwardly facing flanges 206 which engage in face to face relationship a second fitting 208. These fittings 206 and 208 meet at an interface plane 210. In the preassembly of the components of the present invention, the beam fitting 202 remains fixed to the beam 20a, while the fitting 208 is attached to the engine housing 24a. The fittings 206 and 208 are joined together during engine installation by, for example, bolt connections indicated at 212.

There is another plate-like fitting 214 being vertically aligned and having a general U-shaped configuration. This fitting 214 connects to the fitting 208 through a hinged connection, comprising upper and lower bolt members 216 fitting through the matching hinge components. Alternatively, the plate 208 could in the preassembled position be connected to the plate 206, and the connection of the engine housing 24a made by inserting the bolts 216 in the hinge connections.

To connect the fitting 214 to the engine housing 24a, there are provided upper and lower bolt members 218, each connected through a pair of surrounding shock mounts 220 to the upper and lower ends of the fitting 214. Retaining plates 222 can be provided to position the shock mounts 220 and maintain the bolts 218 in the proper position. The outer ends of the bolts 218 have a spherical bearing connection at 224 to upper and lower ears 226 connected to the engine housing 24a.

It is apparent from examining FIG. 13 that the vertical, lateral and torque loads transmitted from the engine housing 24a are reacted into the bolts 218 which in turn act throught the shock mounts 220 to impart these to the fitting 214 that in turn transmits these forces into the beam 22a. However, due to the hinged connection of the bolts 216 and the spherical bearing connections at 224, this connection 200 shown in FIG. 13 does not carry any thrust loads, but provides for fore and aft movement for linear engine growth.

In addition, there is a failsafe connection provided at 228, this connection comprising one or more ears 230 fixedly connected to the inside portion of the engine housing 24a. This ear or ears 230 have an oversized opening or openings 232 in which a connector is positioned, with this connector also being fastened to the aforementioned fitting 208.

Figure 14:
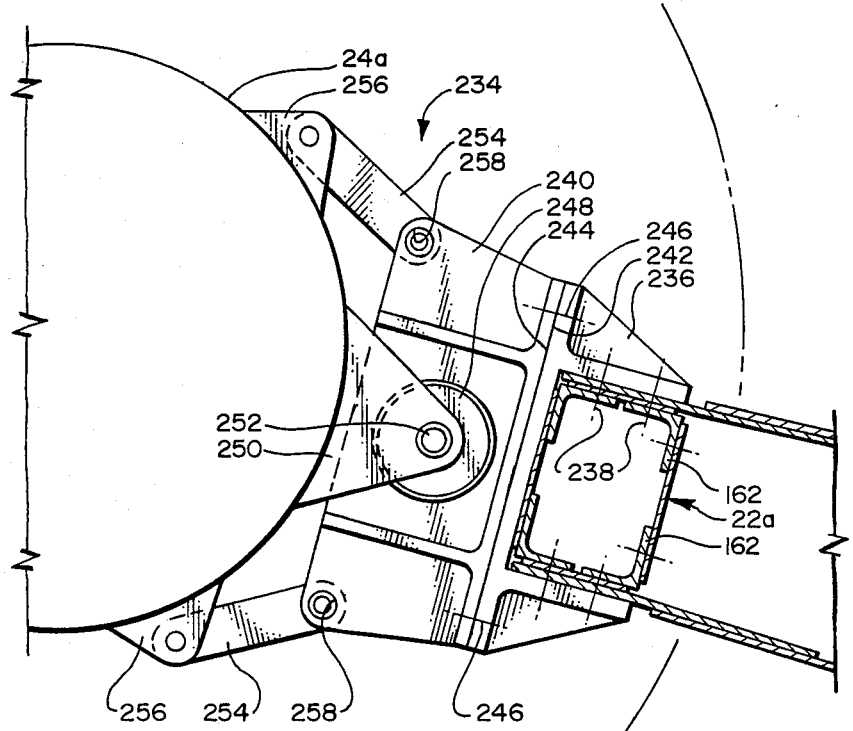
FIG. 14 is a sectional view taken along line 14—14, looking in a forward direction, of a forward beam to engine housing mount to resist vertical and lateral loads, but not torque loads, this connection being a shock-absorbing connection, and also incorporating failsafe connections.
Figure 15:
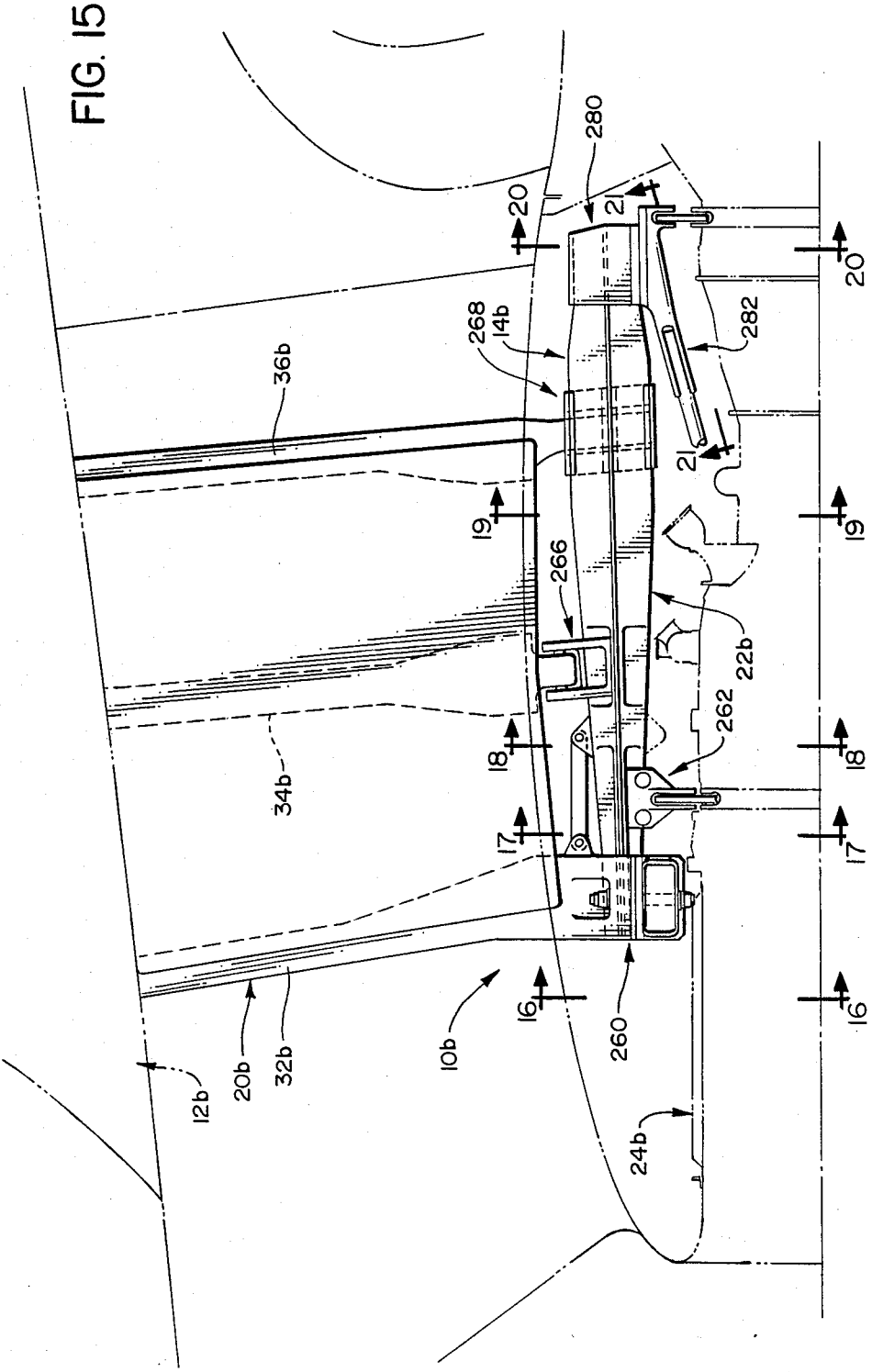
FIG. 15 is a top plan view, similar to FIGS. 1 and 7, showing a third embodiment of the present invention.

FIG. 14 illustrates the forward beam to engine housing connection 234. As a preliminary comment, it should be noted that the section line 14—14 is taken looking in a forward direction, while the other sections have been taken in a manner to be viewing the structure in a rearward direction. This connection 234 is similar in function to the forward beam to engine housing connection 26 of the first embodiment, in that it resists vertical and side loads, but not torque loads. However, the construction is somewhat different.

There is a generally U-shaped beam mount fitting 236 fixedly connected by bolt connections 238 to the beam 22a. There is a second fitting 240 having an inwardly facing contact face 242 that fits against a face 244 of the beam mount fitting 236. The fittings 240 and 236 can be fixedly joined one to another in a suitable manner, such as by bolts indicated at 246. Positioned within the fitting 240 is a donut-like shock absorbing fitting 248. A pair of ears 250 are fixedly connected to the engine housing 24a, and a connecting pin 252 extends between the ears 250 and through the cylindrically shaped shock absorber 248. The vertical and lateral loads from the engine housing 24a are transmitted into the shock absorber 248 and thence through the fitting 240 into the beam 22a.

As a failsafe device, there are provided upper and lower links 254 connected to related ears 256 that are fixedly attached to the engine housing 24a. The inward ends of these links 254 are connected to the fitting 240 through respective failsafe fittings which comprise an oversized opening 258 in which is positioned a suitable connecting device. Thus, in the event of the failure of the connecting member 252 or ears 250, these links 254 would be able to resist the lateral and vertical loads.

As indicated previously, the beam 22a is fixedly connected to the base structure 20a. Accordingly, in mounting the engine 14a to the base structure 22a, the fitting 240 is initially connected to the enigne housing 24a. Then, as the engine 14 is moved into its mounting position, the matching faces 242 and 244 of the fittings 240 and 236, respectively, are placed into contact with one another and then connected.

In terms of function, the second embodiment is generally similar to the first embodiment of FIGS. 1 through 6, in that the vertical and lateral loads are taken at forward and rear locations, and also in that the torque loads are transmitted initially from the engine housing 24a into the rear fitting 200 and then forwardly along the beam 22a. However, as indicated previously, the second embodiment differs from the first embodiment in that the torque loads (as well as the vertical and lateral loads) are transmitted into both the front spar 32a and mid-spar 34a.

A third embodiment of the present invention is illustrated in FIGS. 15 through 21. Components of this third embodiment which are similar to components of the first two embodiments will be given like numerical designtions, with a "b" suffix distinguishing those of the third embodiment. In those instances where corresponding numerical designations are given, to eliminate unneeded redundancy a detailed description will not be given at this time.

The assembly 10b of the third embodiment differs from the prior two embodiments in that the torque load is transferred from a forward location in the engine housing 24b to a front beam to spar connection. This third embodiment is similar to the first embodiment of FIGS. 1 through 6 in that the beam 22a in the preassembled condition is connected to the engine housing 24b and not to the strut or base structure 20b.

The front beam to base structure connection 260 is illustrated in FIG. 16 and is substantially the same as the front beam to base structure connection 40 of the first embodiment. Accordingly, this connection 260 will not be described in detail. Rather, some of the numerical designations given with respect to FIG. 2 will simply be added to this connection 260, with the "b" suffix distinguishing these as being in the second embodiment. As in the first embodiment, this forward beam to base structure connection transmits vertical, side, torque and thrust loads into the front spar, which in this third embodiment is designated 32b.

The forward beam to engine housing connection 262 (shown in detail in FIG. 17) is quite similar in structure and function to the rear beam to engine housing connection 28 of the first embodiment (shown in FIG. 6). Accordingly, components of this connection 262 which are similar to corresponding components in the connection shown in FIG. 6 are given like numerical designations, with the "b" suffix providing the proper distinction. Thus, there are upper and lower links 136b having the connecting locations 138b and 140b. Further, there is the vertical link 144b having upper and lower connections at 150b and 154b, respectively. However, the mounting member 134 is attached to the beam 22b by means of bolts 264. This fitting 262 functions to transmit vertical, lateral and torque loads from the engine housing 24b into the beam 22b.

A beam to mid-spar connection is illustrated in FIG. 18, this being a failsafe connection which is substantially identical to the beam to mid-spar connection 42 illustrated in the first embodiment (see FIG. 4). Accordingly, there will be only numerical designations given to this connection 266, with the "b" suffix distinguishing these components as being related to the third embodiment.

With reference to FIG. 19, there is shown a beam to rear spar connection 268. There is a U-shaped fitting 270 having two downwardly extending mounting plates 272 which are spaced from one another in a forward to rear direction. A cylindrical shaped shock isolator 274 is mounted between the plates 272, and a pin 276 extends through the lower ends of the plates 272 and through an axial center opening in the shock isolator 274. The shock isolator 274 is in turn mounted within an annular fitting formed integrally with the rear strut 36b. It is apparent from examining FIG. 19 that this fitting 266 resists lateral and vertical loads, but not torque loads.

Figure 20:
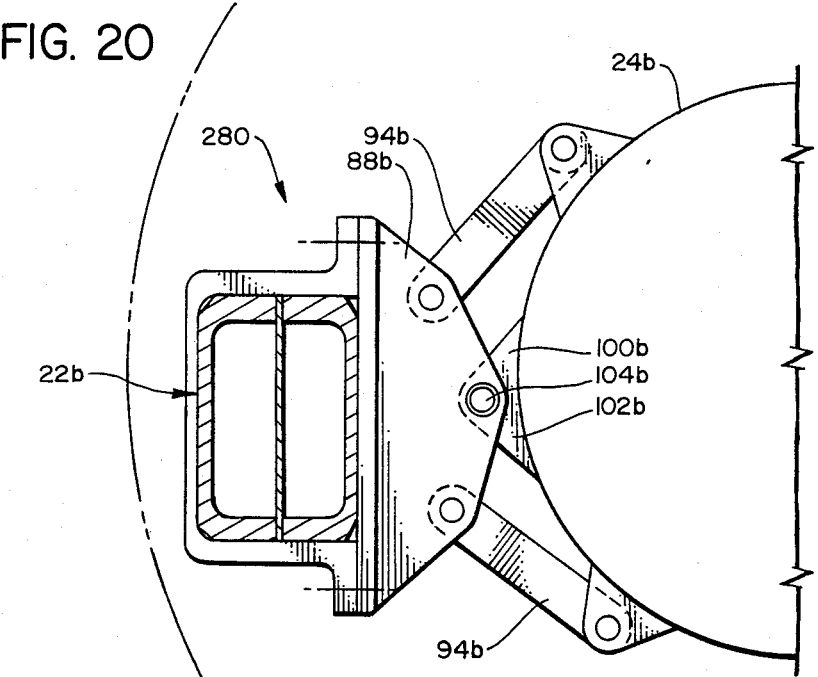
FIG. 20 shows a beam to engine housing connection somewhat similar to that shown in FIG. 3, to resist vertical and lateral loads, but not torque loads, and having a failsafe connection.

With reference to FIG. 20, there is a rear beam to engine housing connection 280. This connection 280 is substantially identical to the connection 26 shown in FIG. 3. Accordingly, no detailed description will be given with reference to the connection 280 of FIG. 20. Rather, numerical designations will be provided in FIG. 20 with the "b" suffix distinguishing these as being related to the third embodiment. There are some structural differences in the manner in which the fitting 88b connects to the beam 22b, but the basic load bearing functions of the fitting 280 of FIG. 20 are substantially the same as those of the connection 26 of FIG. 3.

Figure 21:
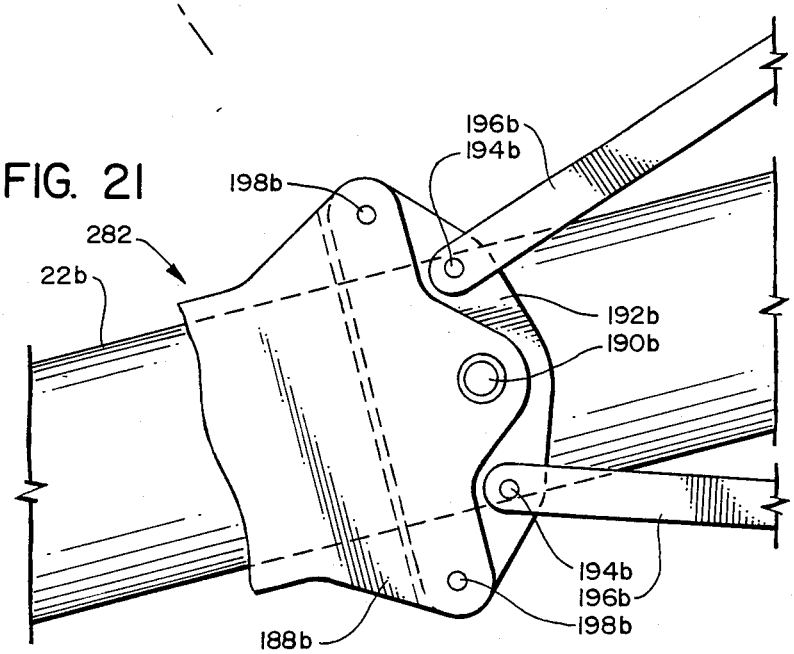
FIG. 21 is a view taken along line 21—21 of FIG. 15, showing a beam to engine housing thrust link connection, this being substantially the same as that shown in FIG. 12.
Figure 22:
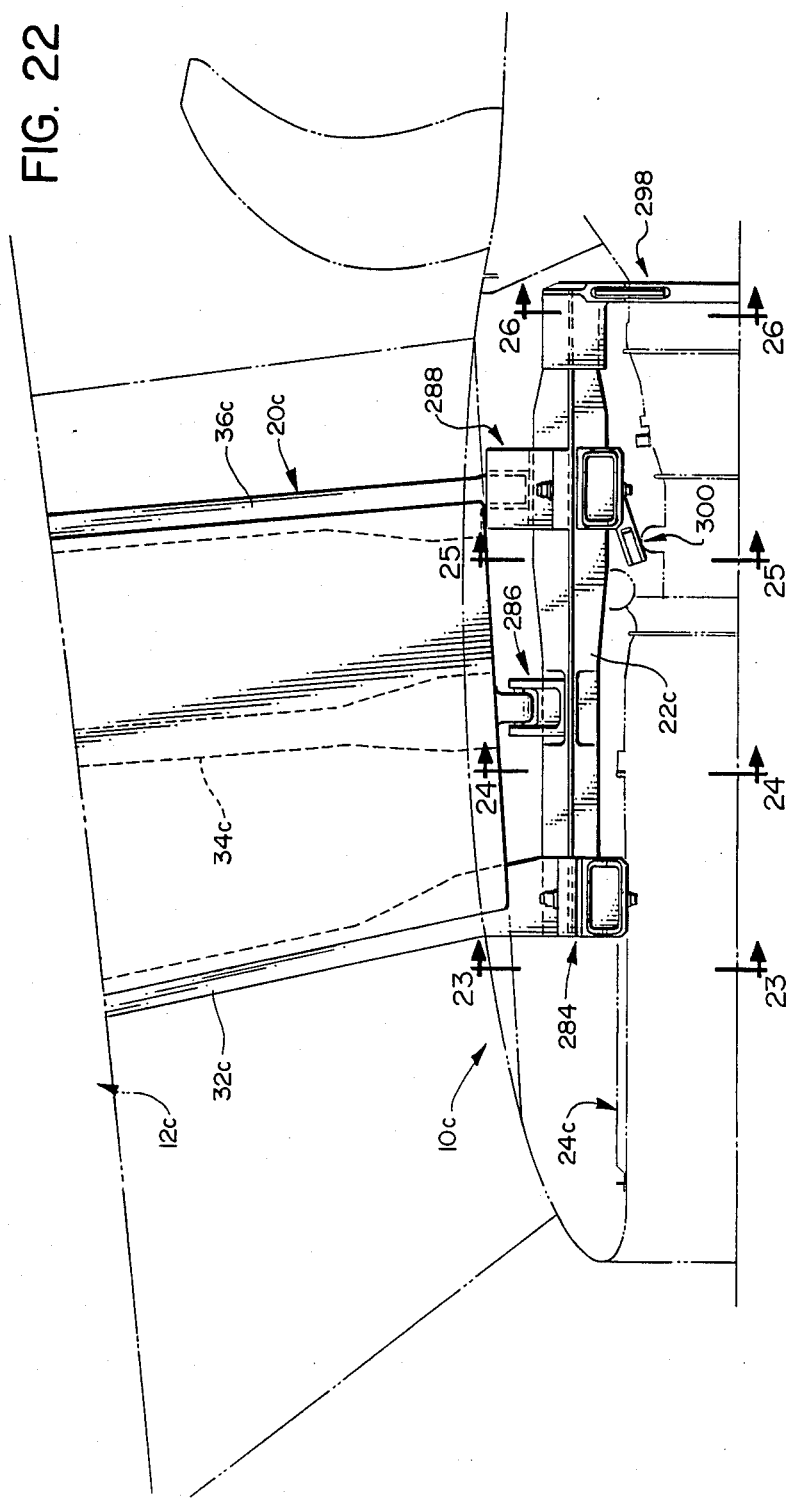
FIG. 22 is a top plan view, similar to FIGS. 1, 7 and 15, showing a fourth embodiment of the present invention.

In FIG. 21, there is shown a rear thrust load connection 282 which is substantially similar to that shown in FIG. 12. Accordingly, corresponding numerical designations will be given with the "b" suffix distinguishing those of the connection 282 of the second embodiment.

A fourth embodiment of the present invention is illustrated in FIGS. 22 through 27. Components of this fourth embodiment which are similar to components of the prior three embodiments will be given like numerical designations, with a"c" suffix distinguishing those of the fourth embodiment. With reference to FIG. 23, there is shown a forward connection 284 where the beam 22c is connected to the front spar 32c and also connected to the engine housing 24c.

That portion of the connection 284 which joins the beam 22a to the front spar 32c is very similar to the connection 40 shown in FIG. 2. Further, that portion of the connection 284 which connects the beam 22c to the engine housing 24c is substantially the same as the connection 26 which is shown in FIG. 3. Accordingly, there will not be a detailed description of this connection 284. Rather, there will be given various numerical designations corresonding to the connections shown in FIGS. 2 and 3, with the "c" suffix distinguishing these components as being part of the connection 284.

It is readily apparent from examining FIG. 23 that vertical loads, lateral loads, torque loads and thrust loads can be transmitted from the beam 22a through the shock isolator mounts to the forward spar 32c. It is also apparent that the connection between the beam 22a and the engine housing 24c is such that vertical and lateral loads are resisted, but not torque loads nor thrust loads. Further, there is a failsafe connection between the engine housing 24c and the beam 22c.

With reference to FIG. 24, there is shown a beam to mid-spar failsafe connection which in function is substantially the same as the beam to mid-spar connection 42 shown in FIG. 4. Accordingly, there will be no detailed description, but the main components will be given numerical designations corresponding to those of FIG. 4, with the "c" suffix distinguishing these as being of the fourth embodiment.

Figure 25:
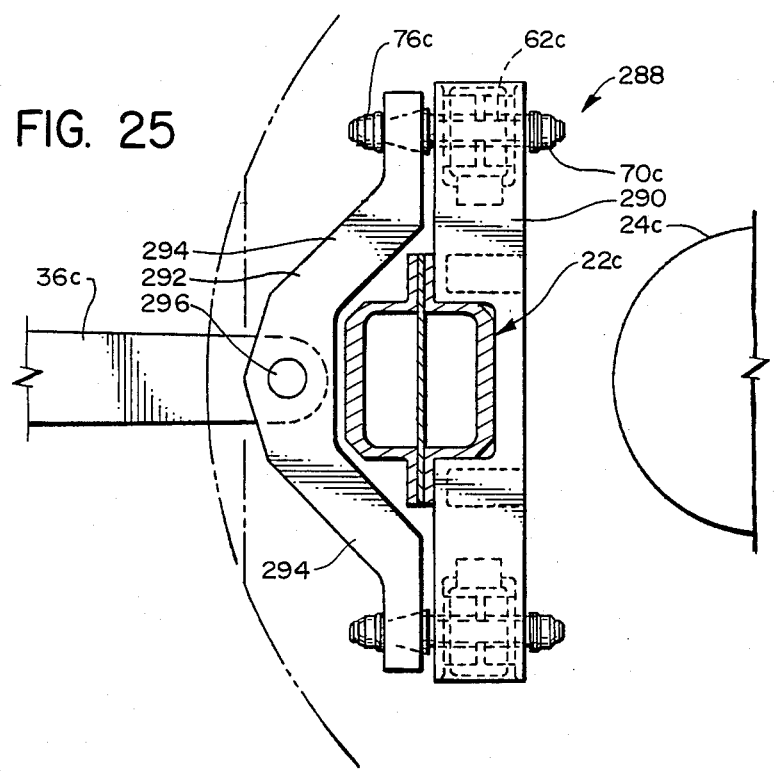
FIG. 25 is a view taken along line 25—25 of FIG. 22, showing a shock-absorbing beam to rear spar connection to transmit vertical and lateral loads, but no torque loads.

FIG. 25 illustrates a beam to rear spar connection 288 which is arranged to transmit vertical and lateral loads to the rear spar 36c, but not torque loads. There is a fitting 290 which is rigidly connected to the beam 22c, and this fitting 290 has upper and lower shock isolator cone bolt connections which are substantially the same as those shown in FIG. 2. These cone bolt connections are made to a second fitting 292 having upper and lower arms 294 that connect to respective upper and lower cone bolt fittings, and a middle pivot connection 296 to the rear spar 36c. It can readily be seen by viewing FIG. 25 that the beam 22c transmits through this connection 288 only vertical and lateral loads, but no torque loads.

Figure 26:
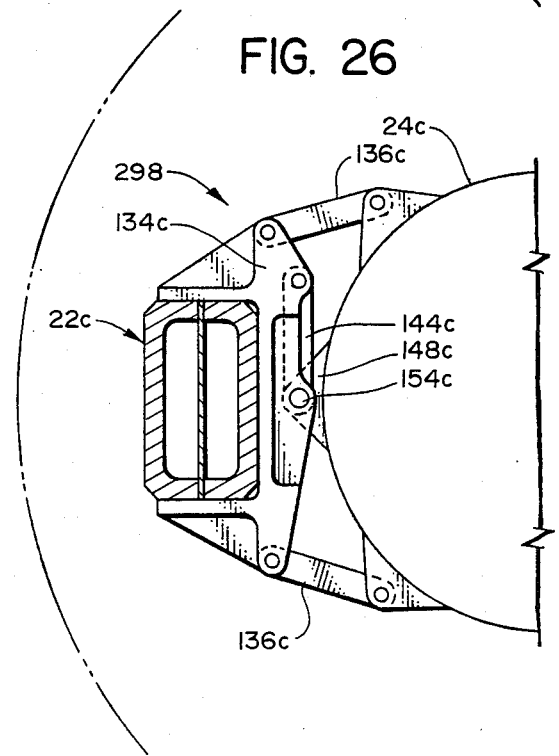
FIG. 26 is a sectional view taken along line 26—26, showing a rear beam to engine housing connection where vertical and horizontal loads are transmitted, but not torque loads, this also being a failsafe connection.

With reference to FIG. 26, there is shown a rear beam to engine housing connection 298. In terms of structure and function, this connection 298 is substantially the same as the fitting 28 illustrated in FIG. 6. This fitting 298 functions to transmit vertical, lateral and torque loads from the engine housing 24c to the beam 22c, but not thrust loads. There will be no detailed description of the connection 298, but numerical designations corresponding to those of FIG. 6 will be presented in FIG. 26, with the "c" suffix distinguishing those components of the fourth embodiment.

Figure 27:
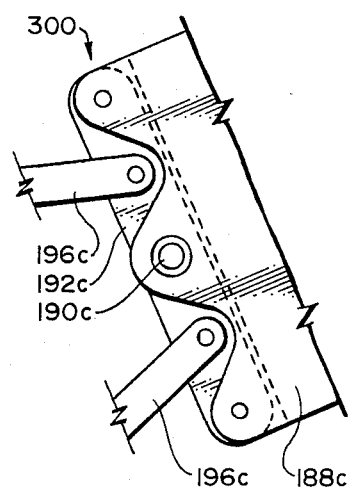
FIG. 27 is a view taken at line 27—27 of FIG. 22, showing a portion of the thrust link connection between the beam and the engine housing.

Finally, FIG. 27 illustrates a thrust connection 300 which is, in terms of overall function the same as the other thrust connections, such as the connection 30a shown in FIG. 12. Accordingly, there will be no detailed description of the connection 300 of FIG. 27, but corresponding numerical designations will be given with the "c" suffix distinguishing those of the fourth embodiment.

It is readily apparent that in this fourth embodiment of FIGS. 22-27, vertical and lateral loads are transmitted from the engine housing 24c to the beam 22c at both forward and rear locations, and in like manner the vertical and lateral loads are transmitted from the beam 22c to the forward and rear spars 32c and 36c. With regard to torque loads, these are transmitted from the engine housing 24c at a rear location through the connection 298. These torque loads are in turn transmitted forwardly through the beam 22c and through the forward connection 284 into the front spar 32c.

It is to be understood that various modifications could be made to the present invention without departing from basic teachings thereof.

What is claimed is:

1. An engine mounting assembly having a longitudinal axis, a horizontal transverse axis, a vertical axis, a forward end and a rear end, said assembly comprising:
    (a) an engine housing having a longitudinally extending engine axis and adapted to carry transverse loads and thrust loads, said housing also being adapted to carry engine developed torque loads and to transmit such torque loads at a predetermined torque transmitting housing location along said engine axis,
    (b) an engine mounting means operatively connected to said engine housing to carry said transverse loads, thrust loads and torque loads, said engine mounting means comprising:
        1. a base support structure adapted to carry said transverse loads and thrust loads and having a predetermined torque load receiving location at which said base support structure is particularly configured and arranged to carry said torque loads,
        2. a longitudinally extending torque beam having a lengthwise axis and being mounted to said base support structure, said beam having:
            i. a first beam to housing load transmitting connection means at a first beam to housing connecting location which is adjacent to said torque transmitting housing location and through which at least a major portion of said beam receives torque loads from the engine housing:
            ii. a second beam to housing load transmitting connection means at a second beam to housing connecting location which is spaced from said first beam to housing connecting location along the lengthwise axis of the beam, said second beam to housing connection means transmitting to said beam no more than a minor portion of the torque loads from the engine housing,
            iii. a third beam to base structure load transmitting connection means at a third beam to base structure connecting location which is adjacent to the torque load receiving location of the base structure and through which said beam transmits at least a major portion of torque loads received by the beam to the base structure,
            iv. a fourth beam to base structure load transmitting connection means at a fourth beam to base structure connecting location which is spaced from said third beam to base structure connecting location along said beam axis, said fourth beam to base structure connecting means transmitting to said base structure no more than a minor portion of the torque loads from the beam.

2. The assembly as recited in claim 1, wherein the first and second beam to housing connection means are arranged so that the beam and the engine housing are particularly adapted to being preassembled in a preassembly condition so as to be connected to, and removed from, said base structure as a unit.

3. The assembly as recited in claim 2, wherein said third and fourth beam to base structure load transmitting connection means are arranged with shock mounting means which are operatively connected to said third and fourth connection means so as to absorb shock loads from said beam to said base member.

4. The assembly as recited in claim 1, wherein said third and fourth beam to base structure load transmitting connection means are arranged with shock mounting means which are operatively connected to said third and fourth connection means so as to absorb shock loads from said beam to said base member.

5. The assembly as recited in claim 1, wherein said third and fourth beam to base structure load transmitting connections are arranged so that the beam is preconnected to said base support structure, and the engine housing as a separate unit is arranged to be connected to, and removed from said beam and said base structure.

6. The assembly as recited in claim 5, wherein said first and second beam to housing connection means are arranged with shock mounting means which are operatively connected to said first and second connection means so as to absorb shock loads from said engine housing to said beam.

7. The assembly as recited in claim 1, wherein said first and second beam to housing connection means are arranged with shock mounting means which are operatively connected to said first and second connection means so as to absorb shock loads from said engine housing to said beam.

8. The assembly as recited in claim 1, wherein said beam comprises two side sections and a middle section, with the two side sections and the middle section being rigidly interconnected with one another, said side and middle sections of the beam being configured in a manner that the middle section forms with either of said side sections a configuration which in transverse section is a closed structure, whereby in the event of failure of one of said side sections, the middle section of the beam is able to function as a torque transmitting means with the other of said side sections of the beam.

9. The assembly as recited in claim 8, wherein the middle section of the beam comprises a plate member positioned between said first and second sections.

10. The assembly as recited in claim 9, wherein each side section of the beam has in cross section a side plate portion and two inwardly extending leg portions which are adjacent said middle section.

11. The assembly as recited in claim 10, wherein said side sections of the beam each have at inner end portions of their respective legs upper and lower flanges by which said side sections are connected to the middle section.

12. The assembly as recited in claim 8, wherein said beam has a horizontal transverse beam axis and a vertical beam axis, with said beam being positioned between said engine housing and said base structure in a direction along said horizontal transverse beam axis, said beam being arranged so as to be more resistant to bending vertically, and less resistant to bending horizontally, whereby said beam is adapted to absorb transverse horizontal shock loads imparted thereto.

13. The assembly as recited in claim 1, wherein said torque transmitting housing location is at a rear portion of said engine housing, and said first beam to housing connection means is at a rear portion of said beam, said third beam to base structure load transmitting connection means being at a forward portion of said beam and connecting to a forward portion of said base structure.

14. The assembly as recited in claim 13, wherein said base support structure comprises a front spar and a rear spar, said assembly being characterized in that both transverse loads and torque loads are transmitted into said front spar from said third connection means, and primarily transverse loads are transmitted into said rear spar from said fourth connection means.

15. The assembly as recited in claim 14, wherein said base support structure further comprises a mid spar, and said assembly further has a fifth beam to base structure connection means which is a failsafe connection, in that during normal operation, said fifth connection means does not transmit any significant loads to said mid spar, but upon failure of one of said third and fourth connection means, said fifth connection means becomes operational to transmit loads into said mid spar.

16. The assembly as recited in claim 15, wherein said first connection means transmits vertical, horizontal and torque loads into said beam, said second connection means transmits vertical and horizontal loads into said beam, said third connection means transmits vertical, horizontal and torque loads from the beam into said front spar, and said fourth connection means transmits vertical and horizontal loads into said rear spar.

17. The assembly as recited in claim 14, wherein said first connection means transmits vertical, horizontal and torque loads into said beam, said second connection means transmits vertical and horizontal loads into said beam, said third connection means transmits vertical, horizontal and torque loads from the beam into said front spar, and said fourth connection means transmits vertical and horizontal loads into said rear spar.

18. The assembly as recited in claim 1, wherein said torque transmitting housing location is at a forward portion of said engine housing, and said first beam to housing connection means is at a forward portion of said beam.

19. The assembly as recited in claim 18, wherein said base support structure comprises a front spar and a rear spar, said assembly being characterized in that both transverse loads and torque loads are transmitted into said front spar from said third connection means, and primarily transverse loads are transmitted into said rear spar from said fourth connecting means.

20. The assembly as recited in claim 19, wherein said base support structure further comprises a mid spar, and said assembly further has a fifth beam to base structure connection means which is a failsafe connection, in that during normal operation, said fifth connection means does not transmit any significant loads to said mid spar, but upon failure of one of said third and fourth connection means, said fifth connection means becomes operational to transmit loads into said mid spar.

21. The assembly as recited in claim 20, wherein said first connection means transmits vertical, horizontal and torque loads into said beam, said second connection means transmits vertical and horizontal loads into said beam, said third connection means transmits vertical, horizontal and torque loads from the beam into said front spar, and said fourth connection means transmits vertical and horizontal loads into said rear spar.

22. The assembly as recited in claim 19, wherein said first connection means transmits vertical, horizontal and torque loads into said beam, said second connection means transmits vertical and horizontal loads into said beam, said third connection means transmits vertical, horizontal and torque loads from the beam into said front spar, and said fourth connection means transmits vertical and horizontal loads into said rear spar.

23. The assembly as recited in claim 1, wherein at least one of said connection means comprises:
  (a) a first connecting structure defining first and second spaced shock isolating recesses,
  (b) first and second shock isolation means positioned in said first and second recesses, respectively,
  (c) a second connecting structure,
  (d) first and second bolt means, each having a first portion extending through said first and second recesses, respectivey, and having an operative shock isolating connection with said first connecting structure through said first and second shock isolation means, respectively,
  (e) said first and second bolt means each having a second portion connecting to said second connecting structure, whereby shock loads imparted on one of said connecting structures are transmitted through said first and second shock isolation means to the other of said connecting structures thereby isolating transmission of shock loads.

24. The assembly as recited in claim 23, wherein at least one of said first and second shock isolation means comprises first and second shock isolation portions, each positioned in its related said shock isolating recess with said first and second shock isolation portions reacting laterally directed loads, and further comprising a third shock isolation portion positioned to react vertical loads.

25. The assembly as recited in claim 23, wherein there is a shock isolation insert positioned in at least one of said first and second shock isolating recesses, said shock isolation insert defining first and second laterally spaced insert recesses receiving said first and second portions of the respective shock isolation means, with said bolt means extending through said first and second portions and through said shock isolation insert, in a manner that shock loads imparted on said first connecting structure are imparted through said first and second portions of the related shock isolation means and through said shock isolation insert to the second connecting structure.

26. The assembly as recited in claim 25, wherein said shock isolation insert comprises a peripheral wall structure having a middle plate defining the first and second insert recesses for the first and second shock isolation portions, with said middle plate having a through opening to receive said related bolt means.

27. The assembly as recited in claim 26, wherein said third shock isolation portion is posiioned adjacent said isolation insert to isolate vertical shock loads.

28. The assembly as recited in claim 23, wherein each of said bolt means is a cone bolt, and the second portion of each of the bolt means is a frusto-conically shaped connecting portion adapted to fit in a matching frusto-conically shaped recess in said second connecting structure.

29. The assembly as recited in claim 28, wherein there is a shock isolation insert positioned in each of said first and second recesses, said shock isolation insert defining first and second laterally spaced recesses receiving first and second portions of the respective shock isolator, with said bolt means extending through said first and second portions and through said shock isolator, in a manner that shock loads imparted on said first connecting structure are imparted through said first and second portions of the related shock isolator and through said shock isolation insert to the second connecting structure.

30. The assembly as recited in claim 26, wherein said shock isolation insert comprises a peripheral wall structure having a middle plate defining the first and second recesses for the shock isolation portions, with said middle plate having a through opening to receive said related bolt means.

31. The assembly as recited in claim 1, wherein at least one of said connection means comprises a mounting structure enclosing said beam, said mounting structure defining top, bottom, and side shock isolation mounting locations, and further comprising top, bottom, and side shock isolating means positioned at each of said shock isolating locations, said mounting structure comprising a first stationary portion mounted to stationary structure, and a second movable portion movable between a closed load bearing position and an open position, whereby by moving said movable portion, access can be obtained to each of said shock isolation means for replacement.

32. The assembly as recited in claim 31, wherein said mounting structure has, at said shock isolating mounting locations, recesses to receive respective shock isolation means, with said shock isolation means being positioned in respective recesses.

33. The assembly as recited in claim 32, wherein the first portion of the mounting structure comprises a laterally extending member and a vertically extending member rigidly interconnected thereto, and the second portion of the mounting structure comprises a second laterally extending member and a second vertically extending member which are movable relative to the first laterally extending and vertically extending members so as to be able to be moved to an open position out of engagement with said beam.

34. The assembly as recited in claim 1, wherein at least one of said connection means comprises a first connecting structure means and a second connecting structure means, upper and lower laterally extending links interconnecting said first and second connecting structure means, a third vertically oriented link interconnecting said first and second connecting structure means, at least one of said links having a connecting location at which said first and second connecting structure means has in addition a failsafe connection to react transverse loads, whereby if there is a failure of one of said links, said failsafe connection can become operative to react transverse loads.

35. The assembly as recited in claim 34, wherein said failsafe connection comprises ear mounting means positioned on said firt mounting structure means, and second ear mounting means on said second mounting structure means, with said first and second ear mounting means being in failsafe operating engagement with one another.

36. The assembly as recited in claim 1, wherein at least one of said connection means comprises a first mounting structure means and a second mounting structure means, a third intermediate mounting structure means pivotally connected to said first mounting structure means about a first axis at a first pivot location and connecting through shock isolation means at a second pivot location to said second mounting structure means.

37. The assembly as recited in claim 36, wherein said third mounting structure means has upper and lower bolt means mounted in shock isolation members to said second mounting structure means, with end portions of said bolt members pivotally connecting to said second mounting structure means.

38. The assembly as recited in claim 1, wherein at least one of said connection means comprises first and second mounting structure means, said first mounting structure means having an intermediate connection to the second mounting structure means through a shock isolation means to resist vertical and lateral loads through said shock isolation means, upper and lower laterally extending links having failsafe connections between said first and second mounting structure means whereby under circumstances where either of said upper and lower links comes into load bearing operation, the first intermediate connection and the link that comes into load bearing operation resists torque loads exerted between said first and second mounting structure means.

39. The assembly as recited in claim 38, wherein said shock isolation means comprises a shock isolation member having a cental opening to receive a connector that extends through the opening in the shock isolation means and is connected to the first mounting structure means, said shock isolation member being positioned within a recess in the second mounting structure means.

40. An engine mounting assembly having a longitudinal axis, a horizontal axis, a transverse axis, a vertical axis, a forward end and a rear end, said assembly comprising:
- (a) An engine housing having a longitudinally extending engine axis and adapted to carry transverse loads and thrust loads, said housing also being adapted to carry engine developed torque loads and to transmit such torque loads at a pre-determined torque transmitting housing location along said engine axis,
- (b) An engine mounting means operatively connected to said engine housing to carry said transverse loads, thrust loads and torque loads, said engine mounting means comprising:
    1. a laterally extending base support structure having a substantial horizontal alignment component, and having an inner portion connected to a main aircraft structure and an outer portion, said base structure being adapted to carry said transverse loads and thrust loads and having a predetermined torque load receiving location at which said base support structure is particularly configured and arranged to carry said torque loads,
    2. a longitudinally extending torque beam having a lengthwise axis and being mounted at the outer portion of the base support structure, with said engine housing being connected through said beam to said base support structure, said beam having:
        i. longitudinally spaced forward and rear beam to housing load transmitting connection means positioned at forward and rear beam to housing connecting locations, respectively, each of said beam to housing connection means being arranged to react lateral and vertical loads from said engine housing to said beam, one of said beam to housing connection means being positioned adjacent to said torque transmitting housing location and arranged also to transmit at least a major portion of torque loads from the engine housing to said beam,
        ii. longitudinally spaced forward and rear beam to base structure connection means positioned at forward and rear beam to base structure connecting locations, respectively, each of said beam to base structure connection means being arranged to transmit at least vertical and lateral loads from said beam to said base structure, one of said beam to base structure connection means being positioned adjacent to said torque load receiving location and arranged to transmit at least a major portion of torque loads received by the beam to the base structure whereby the engine developed torque loads are properly transmitted at desired locations from the engine housing through the beam and to the base support structure.

41. The assembly as recited in claim 40, wherein the beam to housing connection means are arranged so that the beam and the engine housing are particularly adapted to being preassembled in a preassembly condition so as to be connected to, and removed from, said base structure as a unit.

42. The assembly as recited in claim 41, wherein said beam to base structure load transmitting connection means are arranged with shock mounting means which are operatively connected to said beam to base structure load transmitting connection means so as to absorb shock loads from said beam to said base member.

43. The assembly as recited in claim 40, wherein said beam to base structure load transmitting connection means are arranged with shock mounting means which are operatively connected to said beam to base structure load transmitting connection means so as to absorb shock loads from said beam to said base member.

44. The assembly as recited in claim 1, wherein said beam to base structure load transmitting connections are arranged so that the beam is preconnected to said base support structure, and the engine housing as a separate unit is arranged to be connected to, and removed from, said beam and said base structure.

45. The assembly as recited in claim 44, wherein said beam to housing connection means are arranged with shock mounting means which are operatively connected to said beam to housing connection means so as to absorb shock loads from said engine housing to said beam.

46. The assembly as recited in claim 40, wherein said beam to housing connection means are arranged with shock mounting means which are operatively connected to said connection means so as to absorb shock loads from said engine housing to said beam.

47. The assembly as recited in claim 40, wherein said beam comprises two side sections and a middle section, with the two side sections and the middle section being rigidly interconnected with one another, said side and middle sections of the beam being configured in a manner that the middle section forms with either of said side sections a configuration which in transverse section is a closed structure, whereby in the event of failure of one of said side sections, the middle section of the beam is able to function as a torque transmitting means with the other of said side sections of the beam.

48. The assembly as recited in claim 47, wherein the middle section of the beam comprises a plate member positioned between said first and second sections.

49. The assembly as recited in claim 48, wherein each side section of the beam has in cross section a side plate portion and two inwardly extending leg portions which are adjacent said middle section.

50. The assembly as recited in claim 49, wherein said side sections of the beam each have at inner end portions of their respective legs upper and lower flanges by which said side sections are connected to the middle section.

51. The assembly as recited in claim 47, wherein said beam has a horizontal transverse beam axis and a vertical beam axis, with said beam being positioned between said engine housing and said base structure in a direction along said horizontal transverse beam axis, said beam being arranged so as to be more resistant to bending vertically, and less resistant to bending horizontally, whereby said beam is adapted to absorb transverse horizontal shock loads imparted thereto.

52. The assembly as recited in claim 47, wherein said torque transmitting housing location is at a rear portion of said engine housing, and said rear beam to housing connection means is arranged to transmit the major portion of the torque loads to the beam, said forward beam to base structure load transmitting connection means being arranged to transmit the major portion of the torque loads received by the beam to the base structure.

53. The assembly as recited in claim 14, wherein said base support structure comprises a front spar and a rear spar, said assembly being characterized in that both transverse loads and torque loads are transmitted into said front spar from said forward beam to base structure connection means, and primarily transverse loads are transmitted into said rear spar from said rear beam to base structure connection means.

54. The assembly as recited in claim 53, wherein said base support structure further comprises a mid spar, and said assembly further has an intermediate beam to base structure connection means which is a failsafe connection, in that during normal operation, said intermediate connection means does not transmit any significant loads to said mid spar, but upon failure of one of said beam to base structure connection means, said intermediate connection means becomes operational to transmit loads into said mid spar.

55. The assembly as recited in claim 54, wherein said rear beam to housing connection means transmits vertical, horizontal and torque loads into said beam, said forward beam to housing connection means transmits vertical and horizontal loads into said beam, said forward beam to base structure connection means transmits vertical, horizontal and torque loads from the beam into said front spar, and said fourth connection means transmits vertical and horizontal loads into said rear spar.

56. The assembly as recited in claim 53, wherein said rear beam to housing connection means transmits vertical, horizontal and torque loads into said beam, said forward beam to housing connection means transmits vertical and horizontal loads into said beam, said forward beam to base structure connection means transmits vertical, horizontal and torque loads from the beam into said front spar, and said rear beam to base structure connection means transmits vertical and horizontal loads into said rear spar.

57. The assembly as recited in claim 40, wherein said torque transmitting housing location is at a forward portion of said engine housing.

58. The assembly as recited in claim 57, wherein said base support structure comprises a front spar and a rear spar, said assembly being characterized in that both transverse loads and torque loads are transmitted into said front spar from said forward beam to base structure connection means, and primarily transverse loads are transmitted into said rear spar from said rear beam to base structure connecting means.

59. The assembly as recited in claim 58, wherein said base support structure further comprises a mid spar, and said assembly further has an intermediate beam to base structure connection means which is a failsafe connection, in that during normal operation, said intermediate connection means does not transmit any significant loads to said mid spar, but upon failure of one of said beam to base structure connection means, said intermediate connection means becomes operational to transmit loads into said mid spar.

60. The assembly as recited in claim 59, wherein said forward beam to housing connection means transmits vertical, horizontal and torque loads into said beam, said rear beam to housing connection means transmits vertical and horizontal loads into said beam, said forward beam to base structure connection means transmits vertical, horizontal and torque loads from the beam into said front spar, and said rear beam to base structure connection means transmits vertical and horizontal loads into said rear spar.

61. The assembly as recited in claim 58, wherein said forward beam to housing connection means transmits vertical, horizontal and torque loads into said beam, said rear beam to housing connection means transmits vertical and horizontal loads into said beam, said forward beam to base structure connection means transmits vertical, horizontal and torque loads from the beam into said front spar, and said rear beam to base structure connection means transmits vertical and horizontal loads into said rear spar.

62. The assembly as recited in claim 40, wherein at least one of said connection means comprises:
(a) a first connecting structure defining first and second spaced shock isolating recesses,
(b) first and second shock isolation means positioned in said first and second recesses, respectively,
(c) a second connecting structure,
(d) first and second bolt means, each having a first portion extending through said first and second recesses, respectivey, and having an operative shock isolating connection with said first connecting structure through said first and second shock isolation means, respectively,
(e) said first and second bolt means each having a second portion connecting to said second connecting structure,
whereby shock loads imparted on one of said connecting structures are transmitted through said first and second shock isolation means to the other of said connecting structures thereby isolating transmission of shock loads.

63. The assembly as recited in claim 62, wherein at least one of said first and second shock isolation means comprises first and second shock isolation portions, each positioned in its related said shock isolating recess with said first and second shock isolation portions reacting laterally directed loads, and further comprising a third shock isolation portion positioned to react vertical loads.

64. The assembly as recited in claim 62, wherein there is a shock isolation insert positioned in at least one of said first and second shock isolating recesses, said shock isolation insert defining first and second laterally spaced insert recesses receiving said first and second portions of the respective shock isolation means, with said bolt means extending through said first and second portions and through said shock isolation insert, in a manner that shock loads imparted on said first connecting structure are imparted through said first and second portions of the related shock isolation means and through said shock isolation insert to the second connecting structure.

65. The assembly as recited in claim 64, wherein said shock isolation insert comprises a peripheral wall structure having a middle plate defining the first and second insert recesses for the first and second shock isolation portions, with said middle plate having a through opening to receive said related bolt means.

66. The assembly as recited in claim 65, wherein said third shock isolation portion is posiioned adjacent said isolation insert to isolate vertical shock loads.

67. The assembly as recited in claim 62, wherein each of said bolt means is a cone bolt, and the second portion of each of the bolt means is a frusto-conically shaped connecting portion adapted to fit in a matching frusto-conically shaped recess in said second connecting structure.

68. The assembly as recited in claim 67, wherein there is a shock isolation insert positioned in each of said first and second recesses, said shock isolation insert defining first and second laterally spaced recesses receiving first and second portions of the respective shock isolator, with said bolt means extending through said first and second portions and through said shock isolator, in a manner that shock loads imparted on said first connecting structure are imparted through said first and second portions of the related shock isolator and through said shock isolation insert to the second connecting structure.

69. The assembly as recited in claim 68, wherein said shock isolation insert comprises a peripheral wall structure having a middle plate defining the first and second recesses for the shock isolation portions, with said middle plate having a through opening to receive said related bolt means.

70. The assembly as recited in claim 40, wherein at least one of said connection means comprises a mounting structure enclosing said beam, said mounting structure defining top, bottom, and side shock isolation mounting locations, and further comprising top, bottom, and side shock isolating means positioned at each of said shock isolating locations, said mounting structure comprising a first stationary portion mounted to stationary structure, and a second movable portion movable between a closed load bearing position and an open position, whereby by moving said movable portion, access can be obtained to each of said shock isolation means for replacement.

71. The assembly as recited in claim 70, wherein said mounting structure has, at said shock isolating mounting locations, recesses to receive respective shock isolation means, with said shock isolation means being positioned in respective recesses.

72. The assembly as recited in claim 71, wherein the first portion of the mounting structure comprises a laterally extending member and a vertically extending member rigidly interconnected thereto, and the second portion of the mounting structure comprises a second laterally extending member and a second vertically extending member which are movable relative to the first laterally extending and vertically extending members so as to be able to be moved to an open position out of engagement with said beam.

73. The assembly as recited in claim 40, wherein at least one of said connection means comprises a first connecting structure means and a second connecting structure means, upper and lower laterally extending links interconnecting said first and second connecting structure means, a third vertically oriented link interconnecting said first and second connecting structure means, at least one of said links having a connecting location at which said first and second connecting structure means has in addition a failsafe connection to react transverse loads, whereby if there is a failure of one of said links, said failsafe connection can become operative to react transverse loads.

74. The assembly as recited in claim 73, wherein said failsafe connection comprises ear mounting means positioned on said firt mounting structure means, and second ear mounting means on said second mounting structure means, with said first and second ear mounting means being in failsafe operating engagement with one another.

75. The assembly as recited in claim 40, wherein at least one of said connection means comprises a first mounting structure means and a second mounting structure means, a third intermediate mounting structure means pivotally connected to said first mounting structure means about a first axis at a first pivot location and connecting through shock isolation means at a second pivot location to said second mounting structure means.

76. The assembly as recited in claim 75, wherein said third mounting structure means has upper and lower bolt means mounted in shock isolation members to said second mounting structure means, with end portions of said bolt members pivotally connecting to said second mounting structure means.

77. The assembly as recited in claim 40, wherein at least one of said connection means comprises first and second mounting structure means, said first mounting structure means having an intermediate connection to the second mounting structure means through a shock isolation means to resist vertical and lateral loads through said shock isolation means, upper and lower laterally extending links having failsafe connections between said first and second mounting structure means whereby under circumstances where either of said upper and lower links comes into load bearing operation, the first intermediate connection and the link that comes into load bearing operation resists torque loads exerted between said first and second mounting structure means.

78. The assembly as recited in claim 77, wherein said shock isolation means comprises a shock isolation member having a cental opening to receive a connector that extends through the opening in the shock isolation means and is connected to the first mounting structure means, said shock isolation member being positioned within a recess in the second mounting structure means.

* * * * *